US011089481B2

United States Patent

Iida

(10) Patent No.: US 11,089,481 B2
(45) Date of Patent: Aug. 10, 2021

(54) COMMUNICATION APPARATUS COMMUNICATING WITH EXTERNAL APPARATUS IN A SELECTED PROCEDURE FROM AMONG A PLURALITY OF PROCEDURES TO ESTABLISH WIRELESS CONNECTION, CONTROL METHOD FOR COMMUNICATION APPARATUS, AND RECORDING MEDIUM

(71) Applicant: CANON KABUSHIKI KAISHA, Tokyo (JP)

(72) Inventor: Kiyoshi Iida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/443,370

(22) Filed: Jun. 17, 2019

(65) Prior Publication Data

US 2019/0394638 A1 Dec. 26, 2019

(30) Foreign Application Priority Data

Jun. 21, 2018 (JP) ............................ JP2018-118134

(51) Int. Cl.
*H04W 12/50* (2021.01)
*H04W 76/14* (2018.01)
(Continued)

(52) U.S. Cl.
CPC ............ *H04W 12/50* (2021.01); *H04W 76/11* (2018.02); *H04W 76/14* (2018.02); *H04W 76/15* (2018.02); *H04W 36/32* (2013.01)

(58) Field of Classification Search
CPC ........ G01S 1/00; G01S 1/024; H04W 52/286; H04W 12/003; H04W 12/00305; H04W 12/50; H04W 12/55; H04W 36/32
See application file for complete search history.

(56) References Cited

U.S. PATENT DOCUMENTS

2015/0038087 A1* 2/2015 Park .................. H04N 5/23206 455/41.3
2016/0316423 A1* 10/2016 Jia ......................... H04W 48/17
(Continued)

FOREIGN PATENT DOCUMENTS

JP 2014-023077 A 2/2014
JP 2014023077 A * 2/2014

OTHER PUBLICATIONS

English translation for JP 2014-023077A (Year: 2020).*

*Primary Examiner* — Salvador E Rivas
(74) *Attorney, Agent, or Firm* — Canon U.S.A., Inc. IP Division

(57) ABSTRACT

A communication apparatus includes a first communication unit wirelessly communicating with an external apparatus via a first communication method, a second communication unit generating a network and wirelessly communicating with the external apparatus via a second communication method via the network; and a control unit controlling wireless communication with the external apparatus via the second communication unit in a selected procedure from among a plurality of procedures including at least a first procedure and a second procedure, wherein, in the first procedure, the control unit generates a network identified by identification information including a character string, and in the second procedure, generates identification information of the network without using the character string, shares the generated identification information with the external apparatus via the first communication unit, and generates a network identified by the shared identification information, to wirelessly communicate with the external apparatus.

19 Claims, 20 Drawing Sheets

(51) Int. Cl.

| | |
|---|---|
| ***H04W 76/11*** | (2018.01) |
| ***H04W 76/15*** | (2018.01) |
| *H04W 36/32* | (2009.01) |

(56) References Cited

U.S. PATENT DOCUMENTS

2017/0308338 A1* 10/2017 Maeda .................. H04L 67/104
2018/0213093 A1* 7/2018 Hoshino ............ H04N 1/32128

* cited by examiner

| |
|---|
| FIG. 8A |
| FIG. 8B |
| FIG. 8C |
| FIG. 8D |

| |
|---|
| FIG. 9A |
| FIG. 9B |
| FIG. 9C |
| FIG. 9D |

COMMUNICATION APPARATUS COMMUNICATING WITH EXTERNAL APPARATUS IN A SELECTED PROCEDURE FROM AMONG A PLURALITY OF PROCEDURES TO ESTABLISH WIRELESS CONNECTION, CONTROL METHOD FOR COMMUNICATION APPARATUS, AND RECORDING MEDIUM

BACKGROUND

Field

The present disclosure relates to a communication apparatus that communicates with an external apparatus via wireless communication.

Description of the Related Art

Conventionally, there has been known an apparatus that changes a communication parameter (for example, Service Set IDentifier (SSID)) required for a wireless local area network (LAN) connection into a character string easily identifiable by a user. In Japanese Patent Laid-Open No. 2014-023077, a nickname can be set for an apparatus itself. In addition, by using a character string set as the nickname for an SSID, a network that is highly readable and easy for a user to identify can be generated.

In recent years, it has been considered that the communication parameter for the wireless LAN connection is shared by using other types of communication (for example, Near Field Communication and Bluetooth® Low Energy. This enables simplifying the wireless LAN connection. If the communication parameter is shared by apparatuses employing such technology, a network search and participation are also performed automatically. In this case, a highly readable SSID as in Japanese Patent Laid-Open No. 2014-023077 is not necessarily needed. The use of highly readable SSIDs can result in low security.

SUMMARY

A communication apparatus includes a first communication unit configured to wirelessly communicate with an external apparatus via a first communication method, a second communication unit configured to generate a network and wirelessly communicate with the external apparatus via a second communication method via the network, and a control unit configured to control wireless communication with the external apparatus via the second communication unit in a selected procedure from among a plurality of procedures including at least a first procedure and a second procedure, wherein, in the first procedure, the control unit controls generating a network identified by identification information including a character string to wirelessly communicate with the external apparatus via the second communication method via the network, and wherein, in the second procedure, the control unit controls generating identification information of the network without using the character string, sharing the generated identification information with the external apparatus via the first communication unit, and generating a network identified by the shared identification information, to wirelessly communicate with the external apparatus via the second communication method via the network.

Further features will become apparent from the following description of exemplary embodiments with reference to the attached drawings.

DESCRIPTION OF THE EMBODIMENTS

Hereinafter, exemplary embodiments will be described in detail with reference to accompanying drawings.

The exemplary embodiments described below are examples, and modifications or changes are appropriately made depending on a configuration of an apparatus to which the present disclosure is applied or various conditions. The exemplary embodiments can be appropriately combined.

First Exemplary Embodiment

<Configuration of Digital Camera>

Figure 1A:
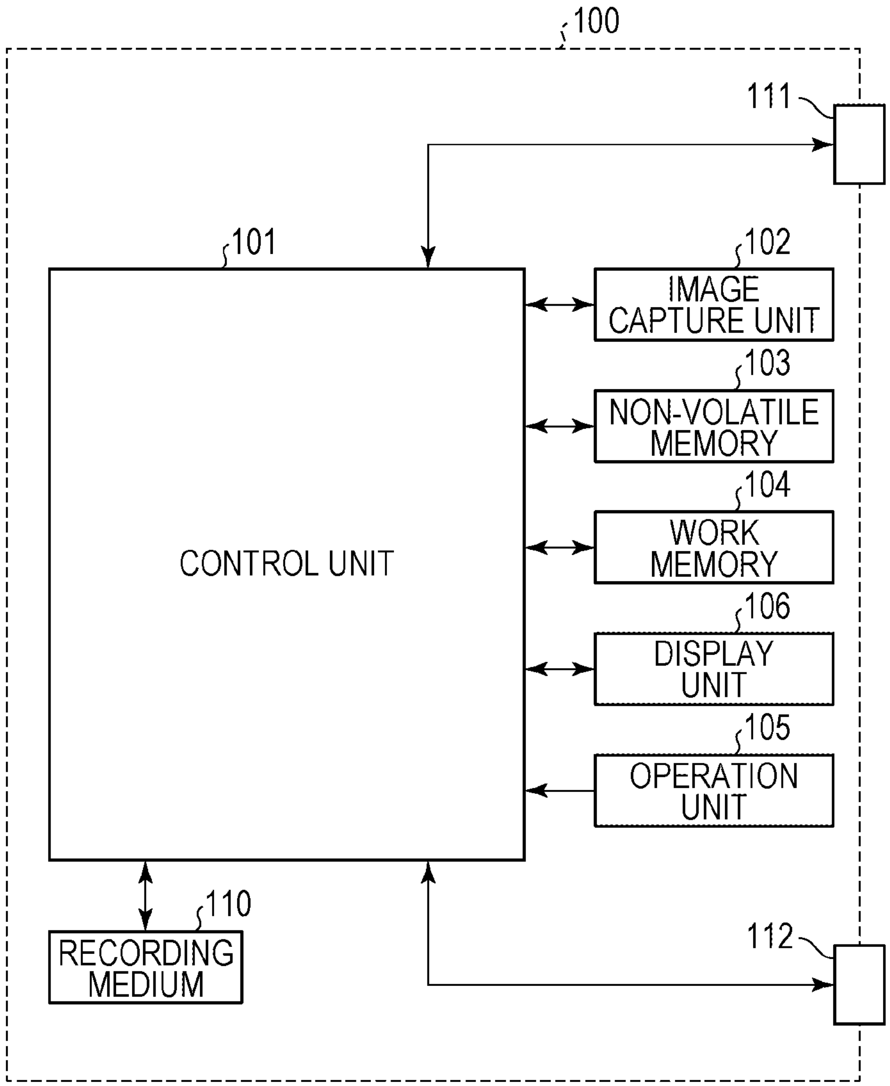
FIG. 1A is a block diagram illustrating a configuration of a digital camera according to a first exemplary embodiment.

FIG. 1A is a block diagram illustrating an exemplary configuration of a digital camera 100 as an example of a communication apparatus according to the present exemplary embodiment. While a digital camera will be described as an example of the communication apparatus, the communication apparatus is not limited to the digital camera. For example, the communication apparatus can be a portable media player, a tablet device, or an information processing apparatus such as a personal computer.

A control unit 101 controls each unit of the digital camera 100 in accordance with an input signal or a program described below. Instead of the control unit 101 controlling the entire apparatus, a plurality of pieces of hardware can control the entire apparatus by sharing processing.

An image capture unit 102 includes, for example, an optical lens unit, an optical system that controls a diaphragm, zooming, focusing, and the like, and an image capture element for converting light (image) introduced via the optical lens unit, into an electrical image signal. A complementary metal oxide semiconductor (CMOS) or a charge coupled device (CCD) is generally used as the image capture element. Under control of the control unit 101, the image capture unit 102 converts subject light focused by a lens included in the image capture unit 102 into an electrical signal by the image capture element, performs noise reduction processing and the like, and outputs digital data as image data. In the digital camera 100 according to the present exemplary embodiment, the image data is recorded on a recording medium 110 in accordance with the standards of Design Rule for Camera File system (DCF).

A non-volatile memory 103 is an electrically erasable/recordable non-volatile memory, and stores a program described below executed by the control unit 101, and the like.

A work memory 104 is used as a buffer memory that temporarily holds the image data captured by the image capture unit 102, an image display memory for a display unit 106, a work area for the control unit 101, or the like.

An operation unit 105 is used to accept an instruction for the digital camera 100 from a user. The operation unit 105 includes, for example, a power button for giving an instruction from the user to turn ON/OFF a power of the digital camera 100, a release switch for giving an image capturing instruction, and a reproducing button for giving an instruction to reproduce the image data. The operation unit 105 further includes an operation member such as a connection button dedicated to start communication with an external apparatus via a communication unit 111 described below. The operation unit 105 also includes a touch panel formed on the display unit 106 described below. Note that the release switch includes a SW1 and a SW2. The SW1 is turned ON when the release switch is in a so-called half-pressed state. With this operation, an instruction for preparing for image capturing, such as autofocus (AF) processing, auto exposure (AE) processing, automatic white balance (AWB) processing, and pre-flash (EF) processing, is accepted. The SW2 is turned ON when the release switch is in a so-called full-pressed state. With this operation, an instruction for capturing an image is accepted.

The display unit 106 performs display of a viewfinder image in a case of image capturing, display of the captured image data, display of characters for an interactive operation, or the like. Note that the digital camera 100 does not necessarily include the display unit 106. It is only necessary for the digital camera 100 to be connectable to an internal or external display unit 106 and to have at least a display control function for controlling display of the display unit 106.

The recording medium 110 can record the image data output from the image capture unit 102. The recording medium 110 can be detachable from the digital camera 100 or can be included in the digital camera 100. That is, it is only necessary for the digital camera 100 to have at least means for accessing the recording medium 110.

The communication unit 111 is an interface for connecting to an external apparatus. The digital camera 100 according to the present exemplary embodiment can exchange data with the external apparatus via the communication unit 111. For example, the image data generated by the image capture unit 102 can be transmitted to the external apparatus via the communication unit 111. Note that, in the present exemplary embodiment, the communication unit 111 includes an interface for communicating with the external apparatus using a so-called wireless local area network (LAN) that conforms to the standards of IEEE 802.11. The control unit 101 implements wireless communication with the external apparatus by controlling the communication unit 111. Note that a communication method is not limited to the wireless LAN. Note that, in the following description, Wireless Fidelity (Wi-Fi) is also used a synonym of the wireless LAN.

A near-field wireless communication unit 112 includes, for example, a modulation/demodulation circuit or a communication controller for processing a wireless signal for an antenna for wireless communication. The near-field wireless communication unit 112 outputs a modulated wireless signal from the antenna and demodulates a wireless signal received by the antenna to implement near-field wireless communication that conforms to the standards of IEEE 802.15 (i.e., Bluetooth®).

In addition, the near-field wireless communication unit 112 can execute both communication using Bluetooth® version 4 or later versions (i.e., Bluetooth® Low Energy and communication using Bluetooth® versions 1 to 3 (i.e., Bluetooth® Classic) in parallel. The Bluetooth® Low Energy has a lower communication speed and lower power consumption than the Bluetooth® Low Energy. The Bluetooth® Low Energy has a lower communication speed and lower power consumption than the wireless LAN. These types of Bluetooth® communication have a narrower communicable range (that is, a shorter communicable distance) than wireless LAN communication. In addition, Bluetooth® Low Energy communication and Bluetooth® Classic communication are not compatible with each other.

In a connection using Bluetooth® Low Energy, the digital camera 100 serves as a peripheral apparatus. That is, the digital camera 100 transmits an advertisement periodically.

Note that the communication unit 111 of the digital camera 100 according to present exemplary embodiment has an access point (AP) mode in which the communication unit 111 operates as an AP in an infrastructure mode, and a CL mode in which the communication unit 111 operates as a client in the infrastructure mode. In addition, by causing the communication unit 111 to operate in the CL mode, the digital camera 100 according to present exemplary embodiment can operate as a CL device in the infrastructure mode. In the case where the digital camera 100 operates as the CL device, establishing a connection with a peripheral AP device enables participation in a network formed by the AP device. Furthermore, by causing the communication unit 111 to operate in the AP mode, the digital camera 100 according to the present exemplary embodiment can also operate as a simplified AP, which is one type of the AP, but has more limited functions (hereinafter referred to as a simple AP). In the case where the digital camera 100 operates as the simple AP, the digital camera 100 forms a network by itself. A peripheral apparatus of the digital camera 100 recognizes the digital camera 100 as an AP device, and the peripheral apparatus can participate in the network formed by the digital camera 100. It is assumed that a program for causing the digital camera 100 to operate as described above is held in the non-volatile memory 103.

Note that, although the digital camera 100 according to the present exemplary embodiment is one type of the AP, the digital camera 100 is a simple AP that does not have a gateway function for transferring data received from a CL device to an Internet service provider or the like. Therefore, even when the digital camera 100 receives data from another apparatus participating in a network formed by the digital camera 100, it is difficult for the digital camera 100 to transfer the received data to a network such as the Internet.

Figure 1B:
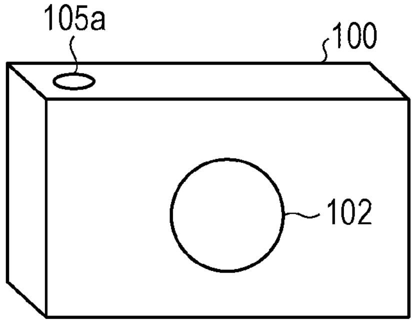
FIG. 1B is an external view of the digital camera according to the first exemplary embodiment.
Figure 1C:
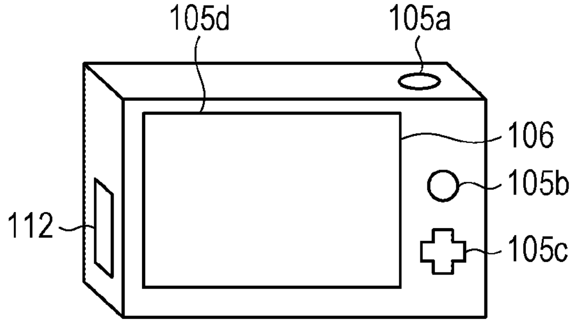
FIG. 1C is an external view of the digital camera according to the first exemplary embodiment.

Next, an external appearance of the digital camera 100 will be described. FIGS. 1B and 1C are diagrams illustrating an exemplary external appearance of the digital camera 100. A release switch 105*a*, a reproducing button 105*b*, a direction key 105*c*, and a touch panel 105*d* are operation members included in the above-described operation unit 105. In addition, the display unit 106 displays an image obtained as a result of image capturing by the image capture unit 102.

The above is the description of the digital camera 100.

<Internal Configuration of Mobile Phone 200>

Figure 2:
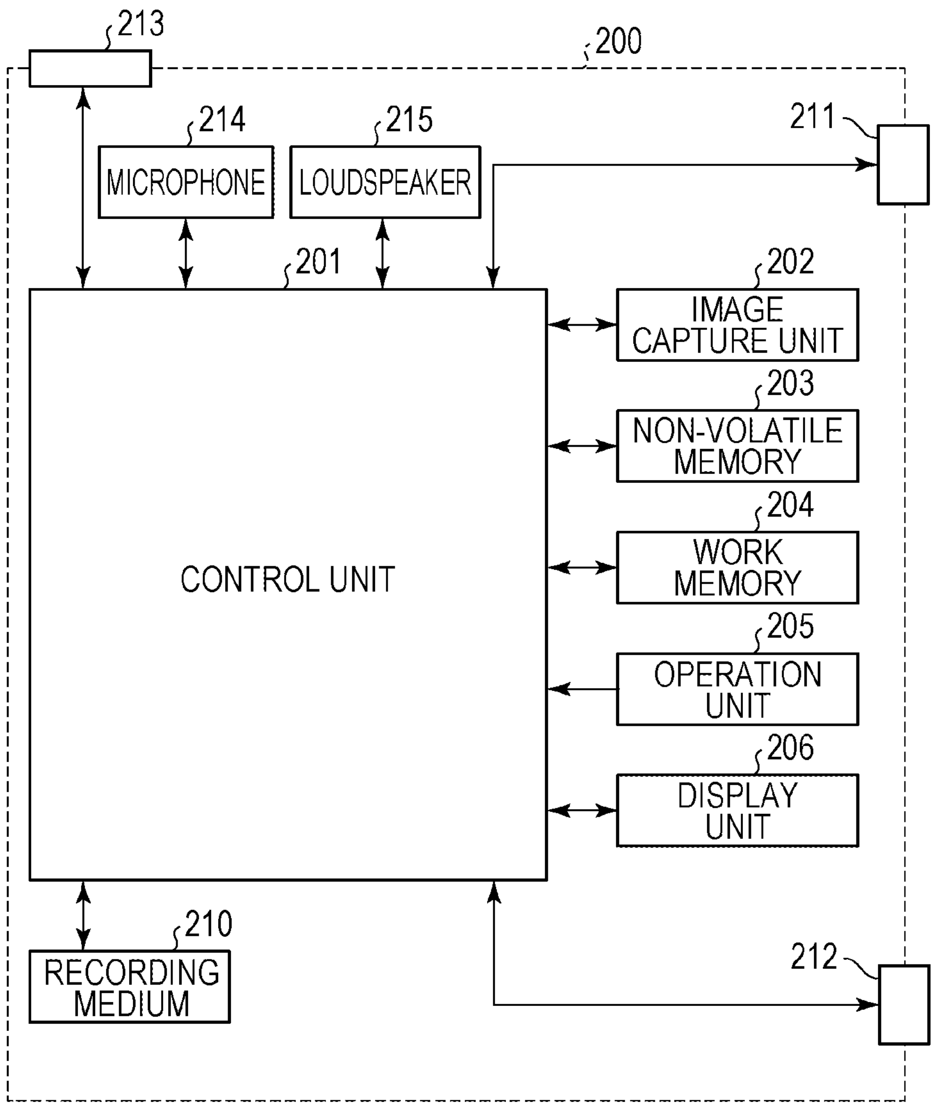
FIG. 2 is a block diagram illustrating a configuration of a mobile phone according to the first exemplary embodiment.

FIG. 2 is a block diagram illustrating an exemplary configuration of a mobile phone 200 as an example of an information processing apparatus according to the present exemplary embodiment. Note that, although a mobile phone will be described as an example of the information processing apparatus, the information processing apparatus is not limited to the mobile phone. For example, the information processing apparatus can be a digital camera, a tablet device, or a personal computer with a wireless function.

A control unit 201 controls each unit of the mobile phone 200 in accordance with an input signal or a program described below. Note that, instead of the control unit 201 controlling the entire apparatus, a plurality of pieces of hardware can control the entire apparatus by sharing processing.

An image capture unit 202 converts subject light focused by a lens included in the image capture unit 202 into an electrical signal, performs noise reduction processing and the like, and outputs digital data as image data. The captured image data is accumulated in a buffer memory, then subjected to a predetermined arithmetic operation by the control unit 201, and recorded in a recording medium 210.

A non-volatile memory 203 is an electrically erasable/recordable non-volatile memory. The non-volatile memory 203 records an operating system (OS) as basic software executed by the control unit 201, and an application that implements an applied function in cooperation with the OS. In the present exemplary embodiment, the non-volatile memory 203 also stores an application for communicating with the digital camera 100.

A work memory 204 is used as an image display memory for a display unit 206, a work area for the control unit 201, or the like.

An operation unit 205 is used to accept an instruction for the mobile phone 200 from the user. The operation unit 205 includes, for example, a power button for giving an instruction from the user to turn ON/OFF a power of the mobile phone 200, and an operation member such as a touch panel formed on the display unit 206.

The display unit 206 displays the image data, displays characters for an interactive operation, or the like. Note that the mobile phone 200 does not necessarily include the display unit 206. It is only necessary for the mobile phone 200 to be connectable to the display unit 206 and to have at least a display control function for controlling display of the display unit 206.

The recording medium 210 can record the image data output from the image capture unit 202. The recording medium 210 can be detachable from the mobile phone 200 or can be included in the mobile phone 200. That is, it is only necessary for the mobile phone 200 to have at least means for accessing the recording medium 210.

A communication unit 211 is an interface for connecting to an external apparatus. The mobile phone 200 according to the present exemplary embodiment can exchange data with the digital camera 100 via the communication unit 211. In the present exemplary embodiment, the communication unit 211 is an antenna, and the control unit 201 can connect to the digital camera 100 via the antenna. Note that the connection with the digital camera 100 can be established directly or can be established via an access point. As a protocol for communicating data, for example, Picture Transfer Protocol over Internet Protocol (PTP/IP) through a wireless LAN can be used. Note that a method for communicating with the digital camera 100 is not limited to the method described above.

A near-field wireless communication unit 212 includes, for example, a modulation/demodulation circuit and a communication controller for processing a wireless signal for an antenna for wireless communication. The near-field wireless communication unit 212 outputs a modulated wireless signal from the antenna and demodulates a wireless signal received by the antenna to implement near-field wireless communication that conforms to the standards of IEEE 802.15. In the present exemplary embodiment, the near-field wireless communication unit 212 communicates with another apparatus in accordance with the standards of IEEE 802.15.1 (i.e., Bluetooth®). The near-field wireless communication unit 212 can execute both communication using Bluetooth® version 4 or later versions (i.e., Bluetooth® Low Energy) and communication using Bluetooth® versions 1 to 3 (i.e., Bluetooth® Classic) in parallel. Bluetooth® Low Energy has a lower communication speed and lower power consumption than Bluetooth® Classic. Bluetooth® Classic has a lower communication speed and lower power consumption than the wireless LAN. These types of Bluetooth® communication have a narrower communicable range (that is, a shorter communicable distance) than wireless LAN communication.

In a connection using Bluetooth® Low Energy, the mobile phone 200 serves as a central apparatus. That is, in response to receipt of an advertisement periodically transmitted by a peripheral apparatus, the mobile phone 200 transmits a connection request to the peripheral apparatus to establish the connection.

A public network communication unit 213 is an interface used in performing public wireless communication. The mobile phone 200 can make a call to another device via the public network communication unit 213. In this case, the control unit 201 implements a call by inputting/outputting an audio signal via a microphone 214 and a loudspeaker 215. In the present exemplary embodiment, the public network communication unit 213 is an antenna, and the control unit 201 can connect to a public network via the antenna. Note that the communication unit 211 and the public network communication unit 213 can share one antenna.

The above is the description of the mobile phone 200.

<UI of Camera>

Next, user interfaces (UIs) of the camera will be described with reference to FIGS. 3A to 3I.

Figure 3A:
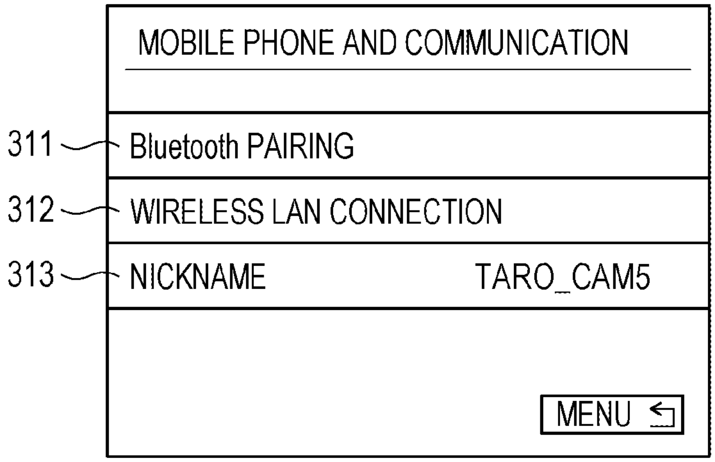
FIGS. 3A to 3I are user interfaces (UIs) of the digital camera according to the first exemplary embodiment.

FIG. 3A illustrates a setting screen of communication by the wireless LAN/Bluetooth® using the mobile phone as an opposite apparatus. A menu 311 is a menu for starting pairing via a Bluetooth® connection in order to establish connection with the mobile phone via the Bluetooth®. A menu 312 is a menu for the user to start setting that is initially performed for manually activating the wireless LAN and establishing the connection with the mobile phone.

A menu 313 is a menu for shifting to a screen for setting a nickname. The nickname is an arbitrary finite character string used to make it easy for the user to find the camera owned by the user from among a plurality of devices to be connected displayed on the mobile phone, when the camera is connected to the mobile phone. When the menu 313 is selected, the screen is shifted to a nickname input screen of FIG. 3B. The input nickname is displayed in a display area 321, and the user can set an arbitrary nickname by performing a touch operation on an input area 322 imitating a keyboard. The set nickname is also displayed in an area of the menu 313 in FIG. 3A.

Other UIs of the camera will be described below.

<UI of Mobile Phone>

Figure 4A:
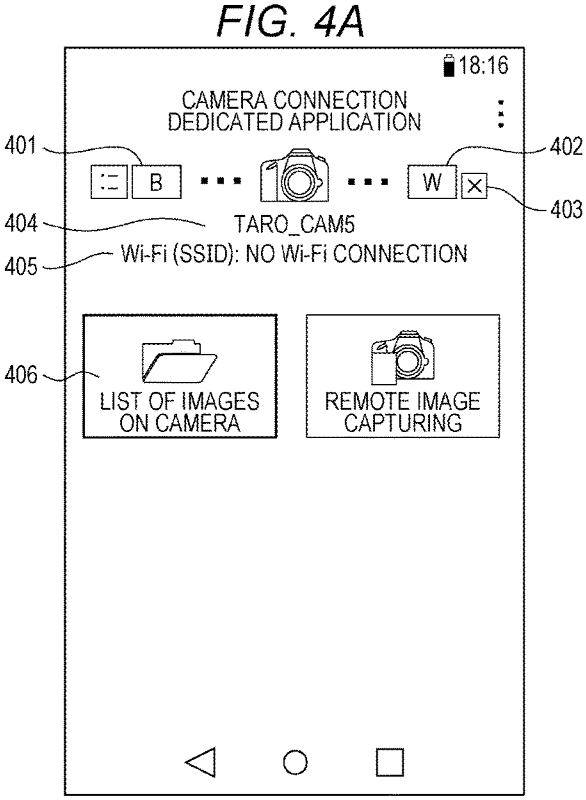
FIGS. 4A to 4G are UIs of the mobile phone according to the first exemplary embodiment.

FIG. 4A illustrates a top screen of an application installed in the mobile phone for wirelessly communicating with the camera.

FIG. 4A illustrates a state where pairing is established by the Bluetooth® and the Bluetooth® connection is established. In the state where the Bluetooth® connection is established, a nickname 404 of the camera is displayed, so that the user of the mobile phone can know which camera is currently connected. In a state where the Bluetooth® connection is not established, a Bluetooth® icon 401 is grayed out to indicate that the Bluetooth® Low Energy connection is not established at present.

In addition, FIG. 4A illustrates an example in which the wireless LAN connection is not established. By displaying "No Wi-Fi connection" in connection information 405, the user is made to know that the wireless LAN connection is not established.

In addition, in the state where the wireless LAN connection with the camera is not established, a wireless LAN icon 402 and a wireless LAN disconnection button 403 are grayed out.

Note that, in a case where Bluetooth® pairing is not completed, menu icons such as a "List of Images on Camera" icon 406 are also grayed out and functions becomes unexecutable.

Other UIs of the mobile phone will be described below.

<Sequence of Manual Connections>

Figure 5:
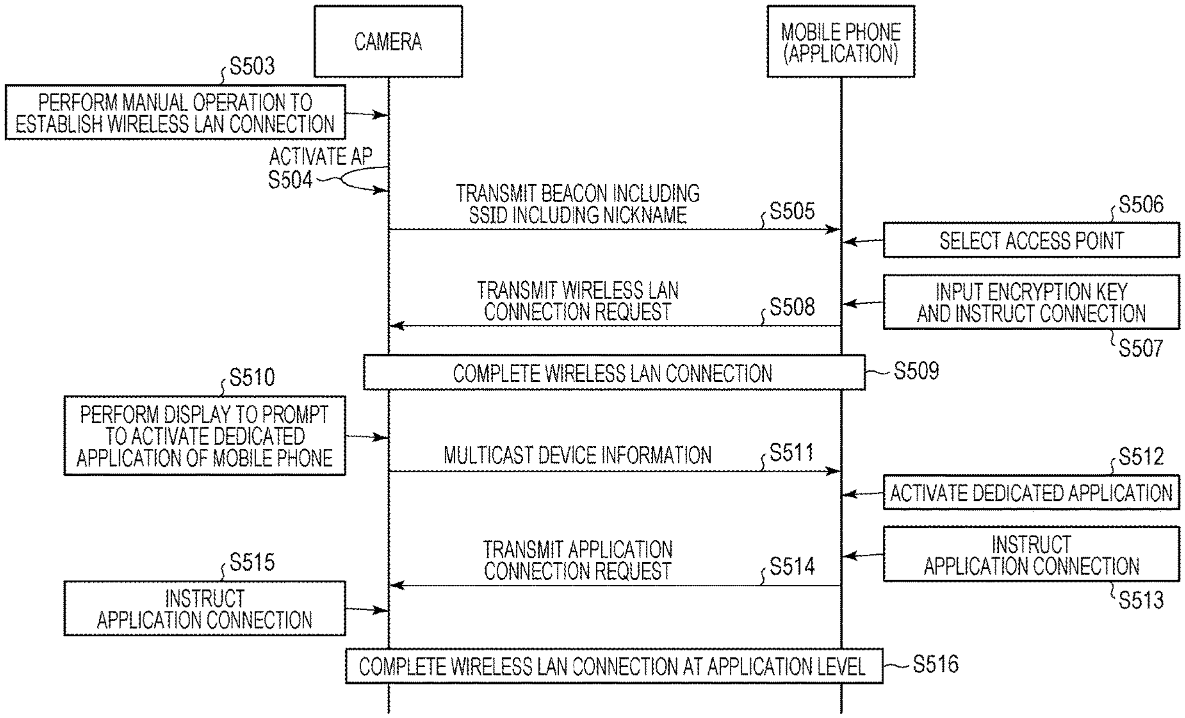
FIG. 5 is a sequence diagram for describing a procedure when establishing a wireless local area network (LAN) connection by a user operation according to the first exemplary embodiment.

FIG. 5 illustrates a sequence in which the user operates the camera 100 and the mobile phone 200 to connect the camera 100 and the mobile phone 200 via the wireless LAN. In the present exemplary embodiment, a manual connection refers to a procedure for connecting the camera 100 and the mobile phone 200 via the wireless LAN by the user operating the camera and the mobile phone without using the Bluetooth®.

Figure 3B:
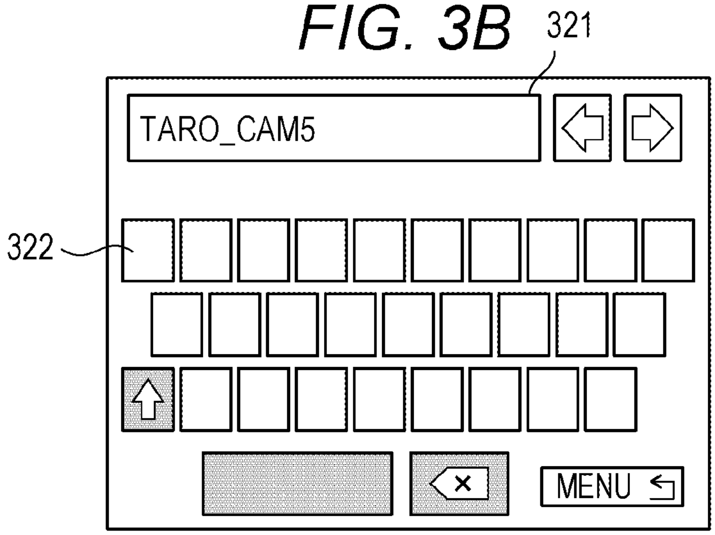

The sequence of FIG. 5 starts with the user operating the camera to open the screen of FIG. 3A in a state where the camera and the mobile phone are turned on. In addition, the sequence starts in a state where the setting of the nickname described in the description of the screen of FIG. 3B is completed.

Figure 3C:
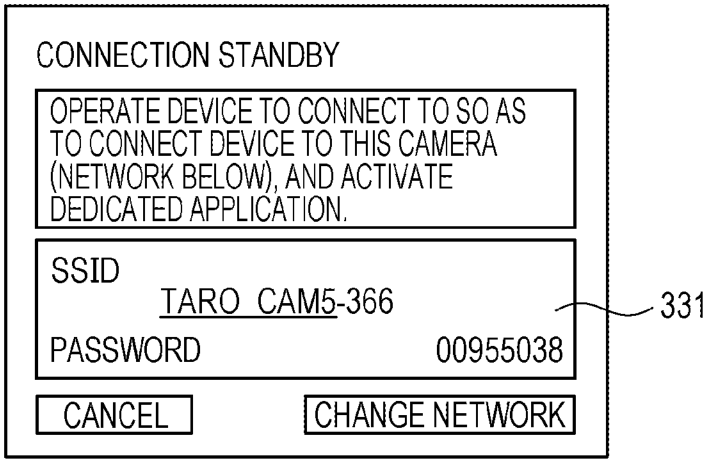

First, in the camera 100, when the user selects the menu 312 of FIG. 3A (S503), the camera 100 activates a simple AP function (S504) and shifts the screen to a connection standby screen of FIG. 3C. In a display area 331 on the connection standby screen, information that the user needs to know in order to establish the wireless LAN connection on the mobile phone side is shown. That is, a Service Set IDentifier (SSID) and a password are displayed. Here, the SSID displayed in the display area 331 includes the nickname set by the user. Note that the camera 100 according to the present exemplary embodiment uses, as the SSID, a character string obtained by adding a hyphen and a random three-digit number automatically generated to the character string set as the nickname. The random three-digit number is changed each time the menu 312 is selected. On the other hand, as the password, an eight-digit number automatically generated at random each time the menu 312 is selected is used. The control unit 101 of the camera 100 transmits a beacon including the SSID displayed in the display area 331 at a constant interval (S505).

Figure 4B:
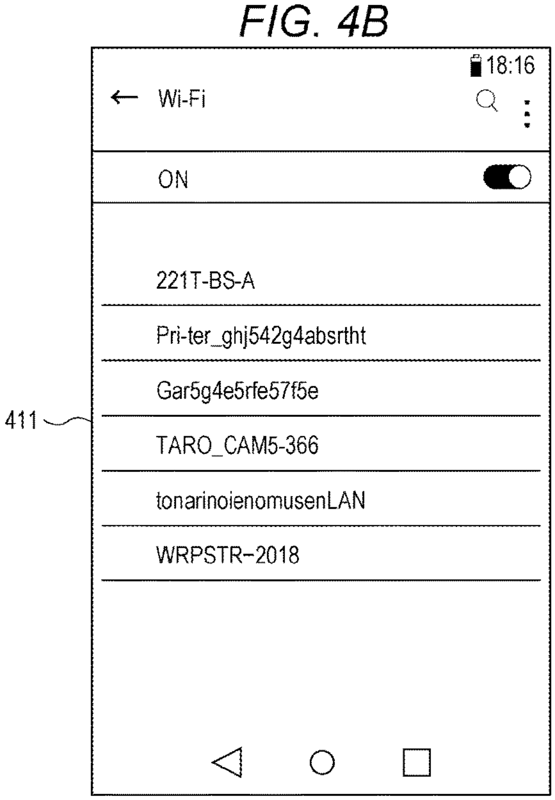

Next, in the mobile phone 200, when a wireless LAN setting screen of the mobile phone of FIG. 4B is displayed by the user operation, the control unit 201 displays a list of SSIDs included in beacons transmitted from APs detected by the communication unit 211 in a display area 411 of FIG. 4B. The user searches for the SSID displayed in the display area 331 of FIG. 3C from among the list of the SSIDs. Since the SSID displayed in the display area 331 of FIG. 3C includes the nickname set by the user, the SSID included in the beacons transmitted by the camera 100 can be easily found.

Figure 4C:
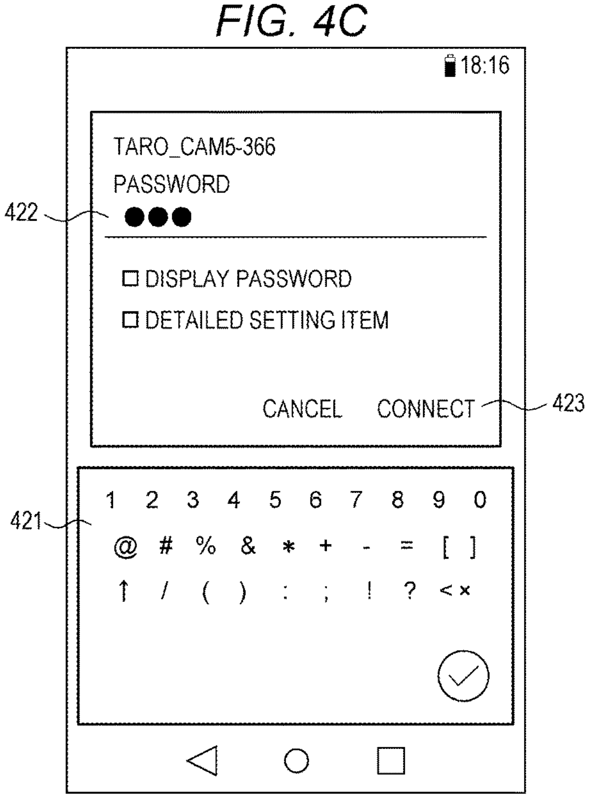

When the user selects the SSID of the camera 100 from the display area 411 of FIG. 4B (S506), the control unit 201 of the mobile phone 200 displays a password input dialog of FIG. 4C. In the password input dialog, a display area 422 for displaying a password, an input area 421 for inputting the password, a connection button 423 for giving an instruction of establishing the wireless LAN connection after the password is input, and the like are displayed. When the user inputs the password displayed in the display area 331 of FIG. 3C of the camera 100 by a touch operation or the like on the input area 421 and selects the connection button 423 (S507), the mobile phone 200 transmits a wireless LAN connection request to the camera 100 (S508).

When the communication unit 111 of the camera 100 detects the wireless LAN connection request, the control unit 101 permits the connection to the network, and the wireless LAN connection with the mobile phone 200 is completed (S509).

Figure 3D:
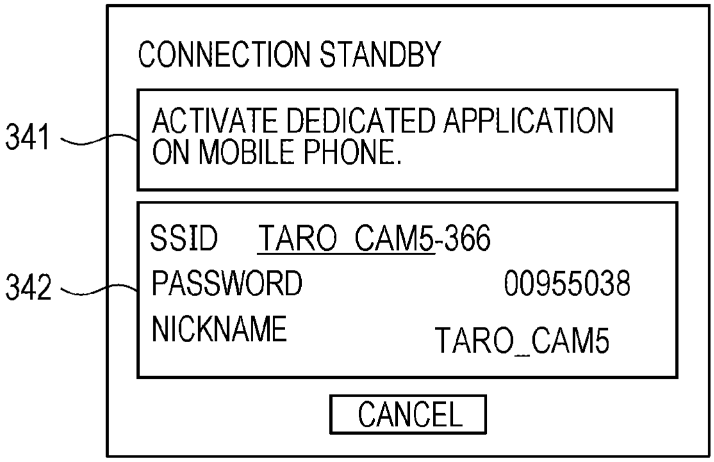

When the wireless LAN connection with the mobile phone 200 is completed, the control unit 101 of the camera 100 prompts the user to activate the dedicated application by the mobile phone as indicated by a display 341 of FIG. 3D (S510).

Figure 4D:
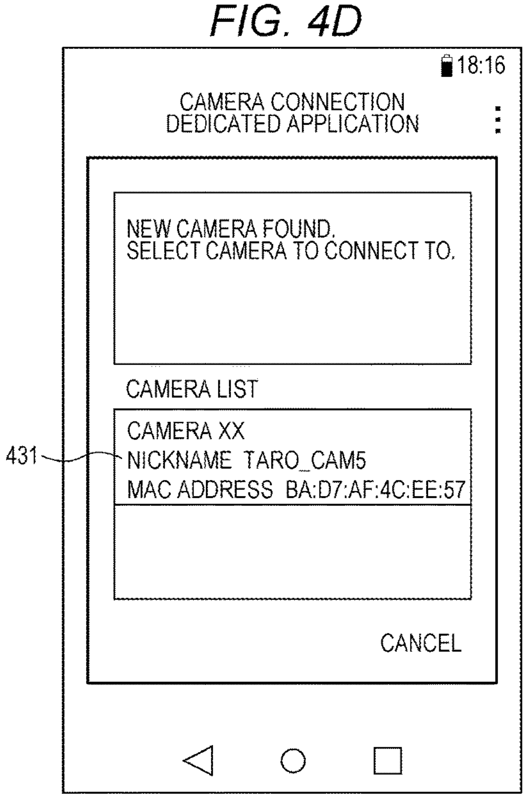

When the control unit 101 of the camera 100 detects that a new device is connected to its own network by the simple AP function activated in S504, the control unit 101 multicasts device information of the camera 100 (S511). In the mobile phone 200, when the user activates the dedicated application for camera connection (S512), the mobile phone 200 collects the device information multicast from the AP and displays a list of the device information in a display area 431 of FIG. 4D. At this time, since the device information includes various information such as a device name, a friendly name (the above-described nickname), and an Internet Protocol (IP) address, cameras that can be connected to the dedicated application are selected and displayed in a list. By specifying the camera 100 from the device name and the nickname in the list of the device information in the display area 431 of FIG. 4D and performing a selection operation (S513), the user transmits a connection request at an application level from the mobile phone 200 to the camera 100 (S514). The application connection request includes mobile phone identification information.

Figure 3E:
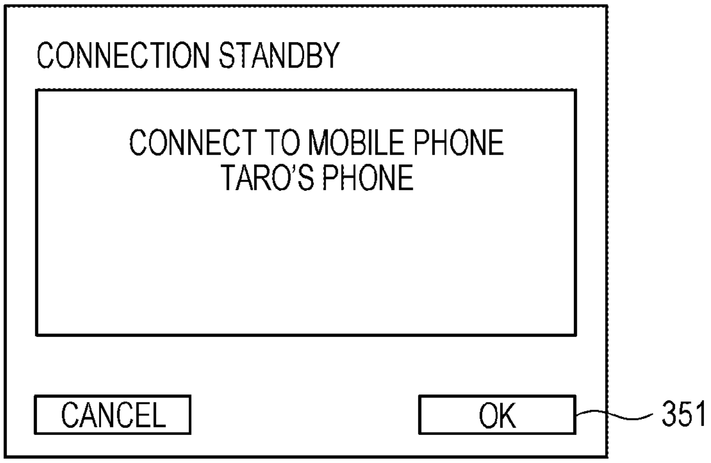
Figure 3F:
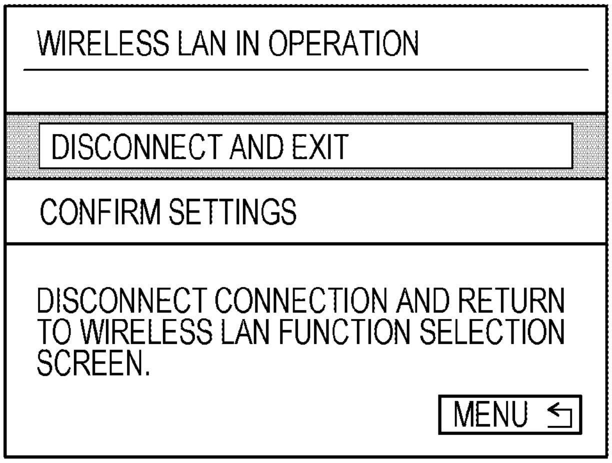
Figure 3G:
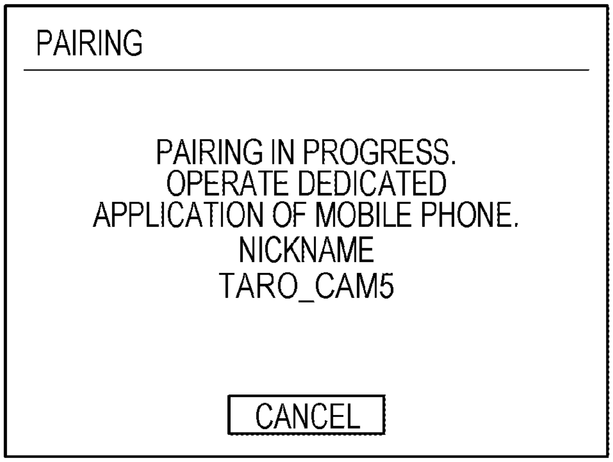

When receiving the application connection request, the camera 100 displays a screen for confirming a connection with the mobile phone to the user, as illustrated in FIG. 3E. Here, the mobile phone identification information (a character string TARO'S PHONE in an example of FIG. 3E) received from the mobile phone is displayed. The user sees the identification information to confirm that the mobile phone to be connected is the desired mobile phone 200, and then selects an OK button 351 (S515). With this operation, the camera 100 permits the connection request from the mobile phone 200. Then, the camera 100 displays a screen of FIG. 3F indicating completion of the wireless LAN connection, and the wireless LAN connection at an application level is completed (S516). In the mobile phone 200, when the wireless LAN connection at an application level is completed, the wireless LAN icon 402 and the wireless LAN disconnection button 403 of FIG. 4A are lit, and the nickname 404 of the camera and the connection information 405 are displayed. Thereafter, by using the wireless LAN, for example, a function for remotely controlling an image capturing function of the camera from the mobile phone and a function for browsing images recorded on the recording medium of the camera from the mobile phone can be used between the camera and the mobile phone.

<Bluetooth® Pairing Sequence>

Figure 6:
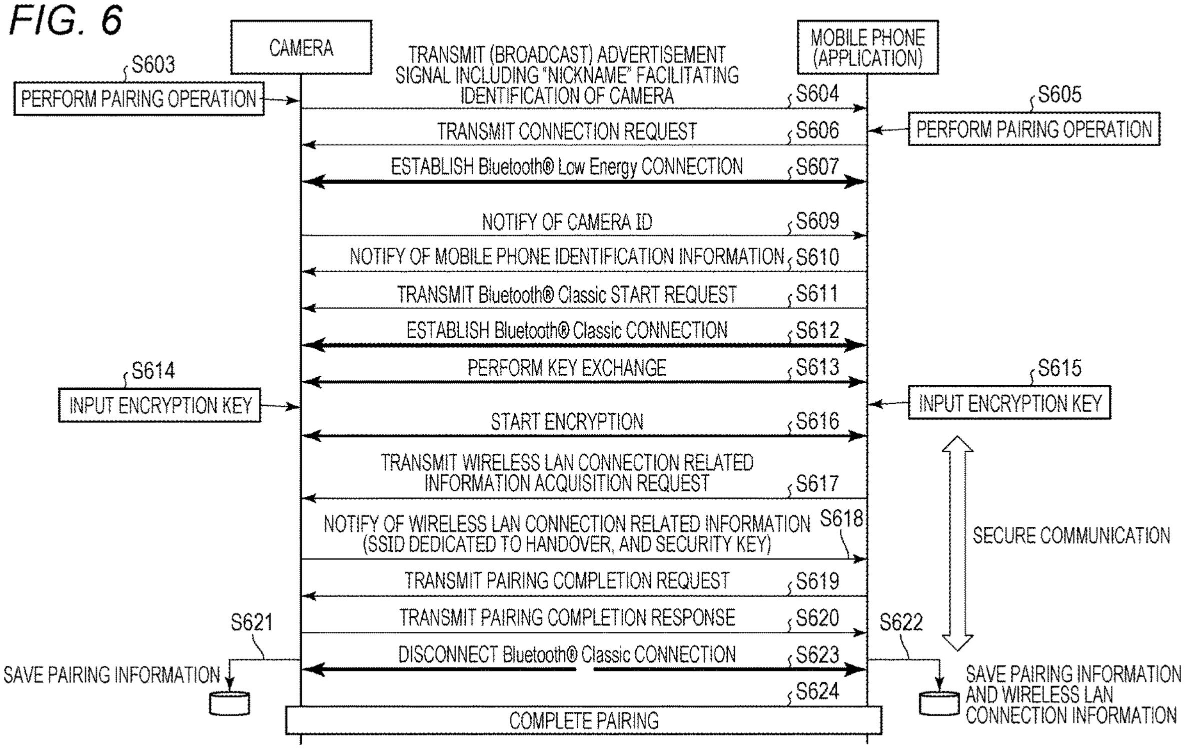
FIG. 6 is a sequence diagram of pairing according to the first exemplary embodiment.

Next, a Bluetooth® pairing sequence will be described with reference to FIG. 6.

Figure 4E:
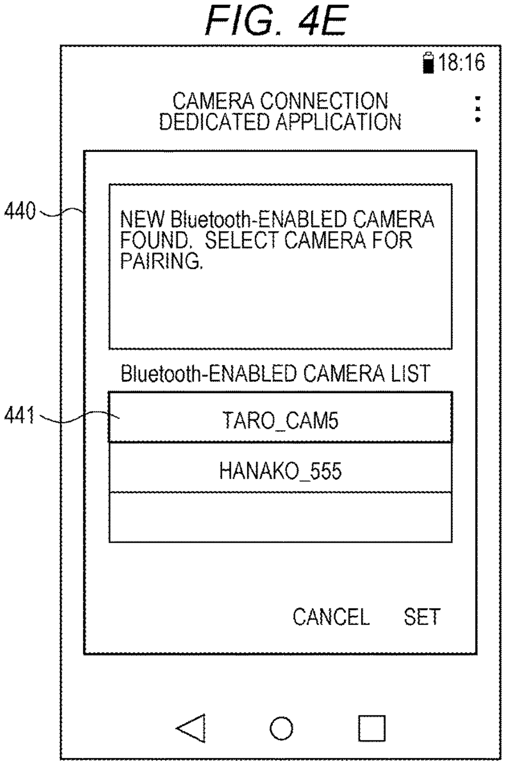

In the camera 100, when the user selects the menu 311 on the screen of FIG. 3A (S603), a function of Bluetooth® Low Energy is activated in the camera 100. Thereafter, the camera 100 starts operation of periodically broadcasting an advertisement signal (S604). The camera 100 displays a screen of FIG. 3G to indicate to the user that a pairing operation is being performed. While the dedicated application is activated, the mobile phone 200 constantly monitors advertisement signals transmitted from peripheral devices, and when an advertisement signal satisfying a condition is detected, a dialog 440 of FIG. 4E is displayed.

In a Bluetooth®-enabled camera list 441 in the dialog 440, nicknames of cameras obtained from advertisement signals transmitted by the cameras are displayed. The camera 100 according to the present exemplary embodiment broadcasts the advertisement signal by including the nickname set in FIG. 3B in the advertisement signal. The user of the mobile phone 200 can easily identify a camera for pairing by seeing the nickname. Note that a character string of the nickname is the same as that of the nickname used for the SSID of the wireless LAN, but unlike the case of the SSID, a random number or a hyphen are not added to the character string of the nickname.

When the user selects the nickname of the camera 100 from the camera list (S605), the mobile phone 200 transmits a Bluetooth® Low Energy connection request to the camera 100 (S606).

The camera 100 accepts the connection request and establishes the Bluetooth® Low Energy connection (S607). Thereafter, the Bluetooth® Low Energy connection is maintained in parallel even during the Bluetooth® Classic communication. When the Bluetooth® Low Energy connection is established, the mobile phone 200 acquires a camera ID of the camera 100 (S609). As used herein, the camera ID represents a value that can uniquely determine the camera 100. Subsequently, the mobile phone 200 notifies the camera 100 of the mobile phone identification information (a mobile phone ID) of the mobile phone 200 (S610). Subsequently, the mobile phone 200 transmits a Bluetooth® Classic start request (S611). When receiving the Bluetooth® Classic start request, the camera 100 performs a Bluetooth® Classic connection procedure to establish a Bluetooth® Classic connection with the mobile phone 200 (S612).

According to a specification of a Bluetooth® Classic protocol, key exchange is performed here (S613) to generate a common pair setting code between the camera 100 and the mobile phone 200. The camera 100 displays a screen of FIG. 3H to display the nickname and a pair setting code 381 of a party to communicate using Bluetooth® Classic. The mobile phone 200 displays a dialog 450 of FIG. 4F to display the nickname and a pair setting code 451 of the camera. At this time, the user confirms that the pair setting code 381 displayed on the camera 100 and the pair setting code 451 displayed on the mobile phone 200 are the same number. This is a confirmation for proving that an opposite party performing the pairing operation is the camera 100 or the mobile phone 200 even if there is a user performing the same operation nearby.

Figure 3H:
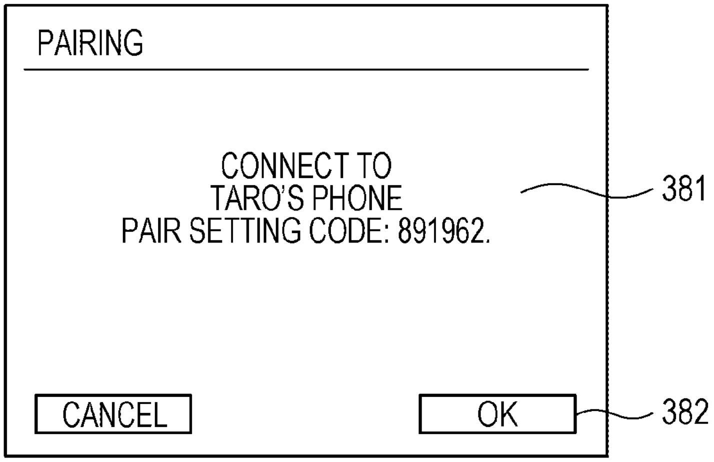
Figure 3I:
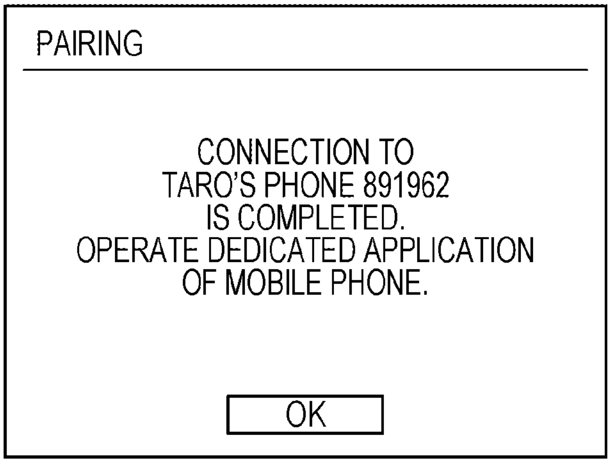
Figure 4F:
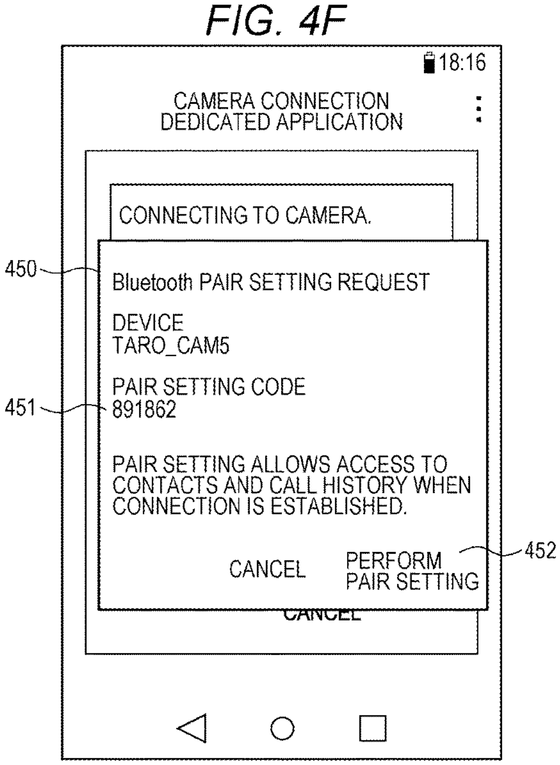

By selection of both an OK button 382 of FIG. 3H of the camera 100 and a "Perform Pair Setting" button 452 in the dialog 450 of FIG. 4F of the mobile phone 200 (S614 and S615), encryption between the camera 100 and the mobile phone 200 is started (S616). Thereafter, the Bluetooth® Classic communication between the camera 100 and the mobile phone 200 is encrypted, and secure communication can be performed.

Subsequently, the mobile phone 200 transmits a request for acquiring related information for the wireless LAN connection (S617). The camera 100 notifies the mobile phone 200 of all information necessary for the wireless LAN connection, such as an SSID dedicated to handover and a security key, using more secure communication (S618). As the SSID dedicated to handover, for example, a character string including a random alphanumeric characters in several digits and having low readability and relatively high security is used. In addition, the SSID dedicated to handover is newly generated in this step each time pairing processing with the mobile phone is executed. In addition, the secure communication refers to the Bluetooth® Classic communication, which is encrypted and thus more secure than the Bluetooth® Low Energy communication, which is not encrypted. In this way, the camera 100 and the mobile phone 200 share a common communication parameter.

The mobile phone 200 transmits a pairing completion request (S619), and in response to the pairing completion request, the camera 100 transmits a pairing completion response (S620). The camera 100 saves, as pairing information, the mobile phone identification information acquired in S610 in the non-volatile memory 103 (S621). The camera 100 displays a screen of FIG. 3I to indicate to the user that the pairing is completed.

The mobile phone 200 saves the camera ID acquired in S609 as pairing information in the non-volatile memory 203 together with the related information for the wireless LAN connection acquired in S618 (S622). In the mobile phone 200, the Bluetooth® icon 401 of FIG. 4A is lit, and the nickname 404 of the camera is displayed. In addition, grayed-out display of the "List of Images on Camera" icon 406 is released to indicate to the user that the pairing is completed. The mobile phone 200 disconnects the Bluetooth® Classic connection (S623), and the Bluetooth® pairing is completed (S624). The Bluetooth® Low Energy communication continues even if the Bluetooth® Classic communication is disconnected.

In addition, in a case where, after the above processing is completed, image capturing is performed by the digital camera 100 to generate an image, and then an operation for turning off the power of the digital camera 100 is performed, the digital camera 100 requests the mobile phone 200 connected by the Bluetooth® Low Energy communication to establish a Bluetooth® Classic communication. If the Bluetooth® Classic communication is established in response to the request, a function for reducing the generated image and automatically transmitting the image is executed. The Bluetooth® Low Energy communication is maintained while the Bluetooth® Classic communication is established and the reduced image is transmitted.

<Bluetooth® Low Energy Reconnection Sequence>

Figure 7:
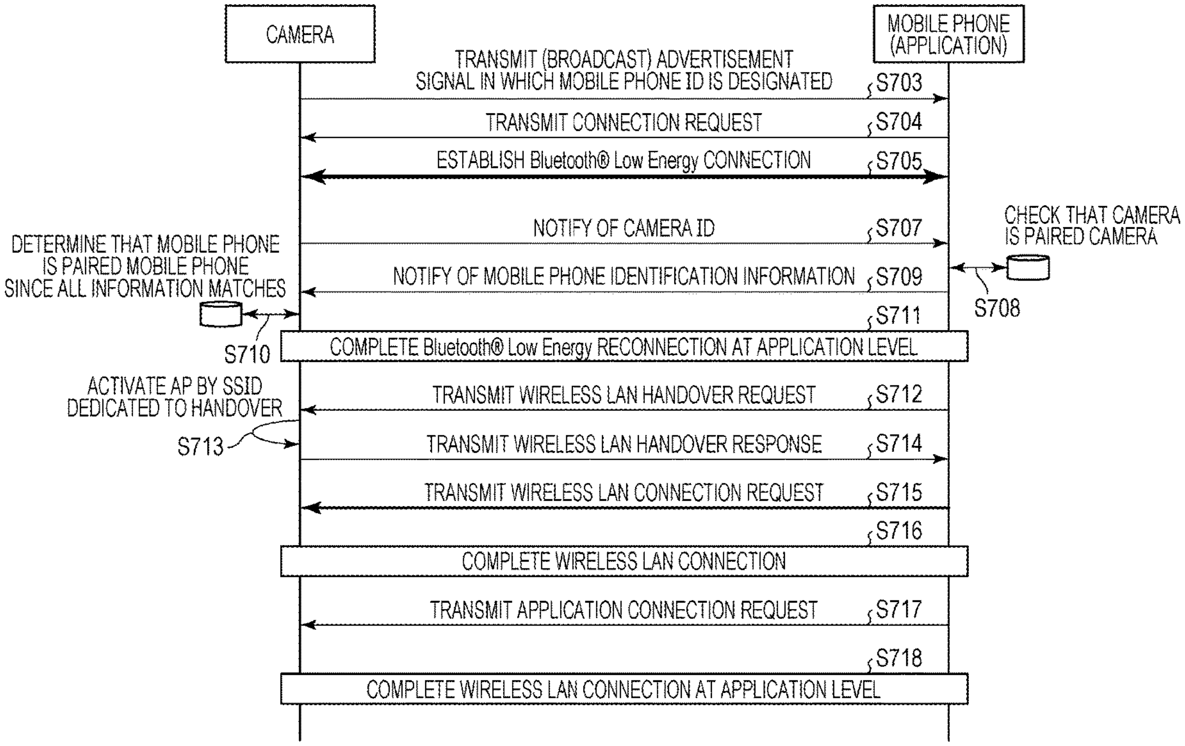
FIG. 7 is a sequence diagram for describing a procedure when switching from Bluetooth® to a wireless LAN is performed according to the first exemplary embodiment.

Next, a Bluetooth® Low Energy reconnection procedure will be described with reference to FIG. 7.

This sequence is started in a state where the pairing of the camera 100 and the mobile phone 200 is completed and the Bluetooth® Low Energy connection is disconnected.

First, the camera 100 designates the ID of the mobile phone 200 acquired at the time of the pairing, and periodically transmits the advertisement signal (S703). When the mobile phone 200 receives the advertisement signal designating the ID of the mobile phone 200, the mobile phone 200 transmits a Bluetooth® Low Energy connection request to the camera 100 (S704). When the camera 100 accepts the connection request, the Bluetooth® Low Energy connection is established (S705). Since the Bluetooth® Low Energy connection is a non-encrypted communication path, communication is performed in plain text. Therefore, less communication is required for the connection, and a time required for the connection establishment is shorter than in the case where encryption is performed.

The mobile phone 200 acquires the camera ID from the camera 100 (S707), and compares the acquired camera ID with the pairing information saved in the non-volatile memory 203 at the time of the pairing, to identify that the camera 100 is the paired camera 100 (S708). Since it is found that the camera 100 is the paired camera 100, the mobile phone 200 notifies the camera 100 of the mobile phone identification information (mobile phone ID) (S709). Since the pairing information saved in the non-volatile memory 103 at the time of the pairing matches the acquired mobile phone ID, the camera 100 identifies that the mobile phone 200 is the paired mobile phone 200 (S710). At this point, a Bluetooth® Low Energy reconnection at an application level is completed (S711). When the reconnection is completed, in the mobile phone 200, the Bluetooth® icon 401 of FIG. 4A changes from grayed-out display to lit display, and the nickname 404 of the camera is displayed. In addition, functions for a camera operation such as the "List of Images on Camera" icon 406 can be executed.

<Wireless LAN Handover Sequence>

Next, a procedure of handover to the wireless LAN will be described with reference to FIG. 7. The procedure is started in a state where the Bluetooth® pairing is completed and the Bluetooth® Low Energy connection at an application level is completed.

When the "List of Images on Camera" icon 406 is tapped on the top screen of FIG. 4A of the mobile phone 200, the mobile phone 200 transmits a wireless LAN handover request by a Bluetooth® Low Energy message (S712). In response to the wireless LAN handover request, the camera 100 activates the simple AP function (S713). The SSID included in the beacon of the simple AP that is activated in response to the handover request does not need to be searched by the user. Therefore, the SSID dedicated to handover, which is generated without using the nickname that can include personal information of the user, is used. As the SSID generated without using the nickname, for example, random alphanumeric characters in several digits can be employed. By thus generating and using the SSID with low readability, security is enhanced. The SSID dedicated to handover is the SSID that is generated in the above-described pairing processing and shared with the mobile phone 200.

Since the mobile phone 200 has acquired the SSID dedicated to handover at the time of the pairing, the mobile phone 200 can transmit a wireless LAN connection request to the network of the camera 100 without receiving the beacon including the SSID from the camera 100. The camera 100 can stop the transmission of the SSID by applying a stealth setting to the AP. In this way, a connection from a third party can be prevented.

After activating the simple AP function, the camera 100 transmits a wireless LAN handover response to the wireless LAN handover request via the Bluetooth® Low Energy (S714). In response to the wireless LAN handover response, the mobile phone 200 transmits a wireless LAN connection request (S715). When the communication unit 111 of the camera 100 detects the wireless LAN connection request, the control unit 101 permits the connection to the AP, and the wireless LAN connection with the mobile phone 200 is completed (S716).

In addition, in the case where the user manually sets the wireless LAN connection, it is necessary to multicast the device information of the camera 100 to a device connected to the same AP. However, since the mobile phone 200 saves the device information of the camera 100 acquired at the time of the pairing, the mobile phone 200 can transmit the application connection request to the camera 100 without multicasting the device information such as a MAC address of the camera 100. Therefore, security can be improved by performing filtering of the MAC address.

Figure 4G:
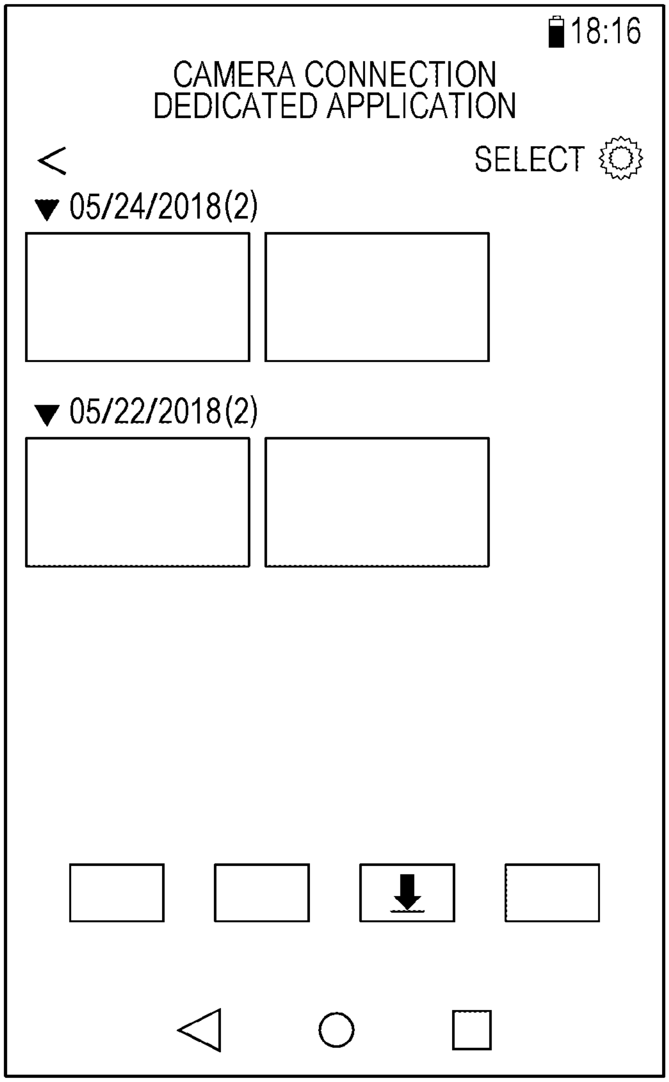

When the wireless LAN connection is completed (S716), the mobile phone 200 transmits an application connection request to the camera 100 (S717). When the camera 100 permits the application connection request, the connection at an application level is completed (S718). The mobile phone 200 acquires image data and the like from the camera 100 by communication on the wireless LAN, and displays a camera image list screen of FIG. 4G.

Note that even in a case where a remote image capturing icon is selected instead of the "List of Images on Camera" icon 406, the procedure up to S716 is similar.

In this way, in the case where the user searches for a device as a connection partner, the nickname is included in the SSID with priority given to ease of searching, but in the case where the wireless LAN connection is established by handover, the nickname is not included in the SSID, so that security can be improved. In addition, if possible, security can be further improved by using the stealth setting of the AP and the filtering of the MAC address in combination.

<Camera Control Flow>

Next, operation of the camera for implementing the procedures of FIGS. 5 to 7 described above will be described with reference to FIGS. 8A to 8D.

Figures 8, 8A:
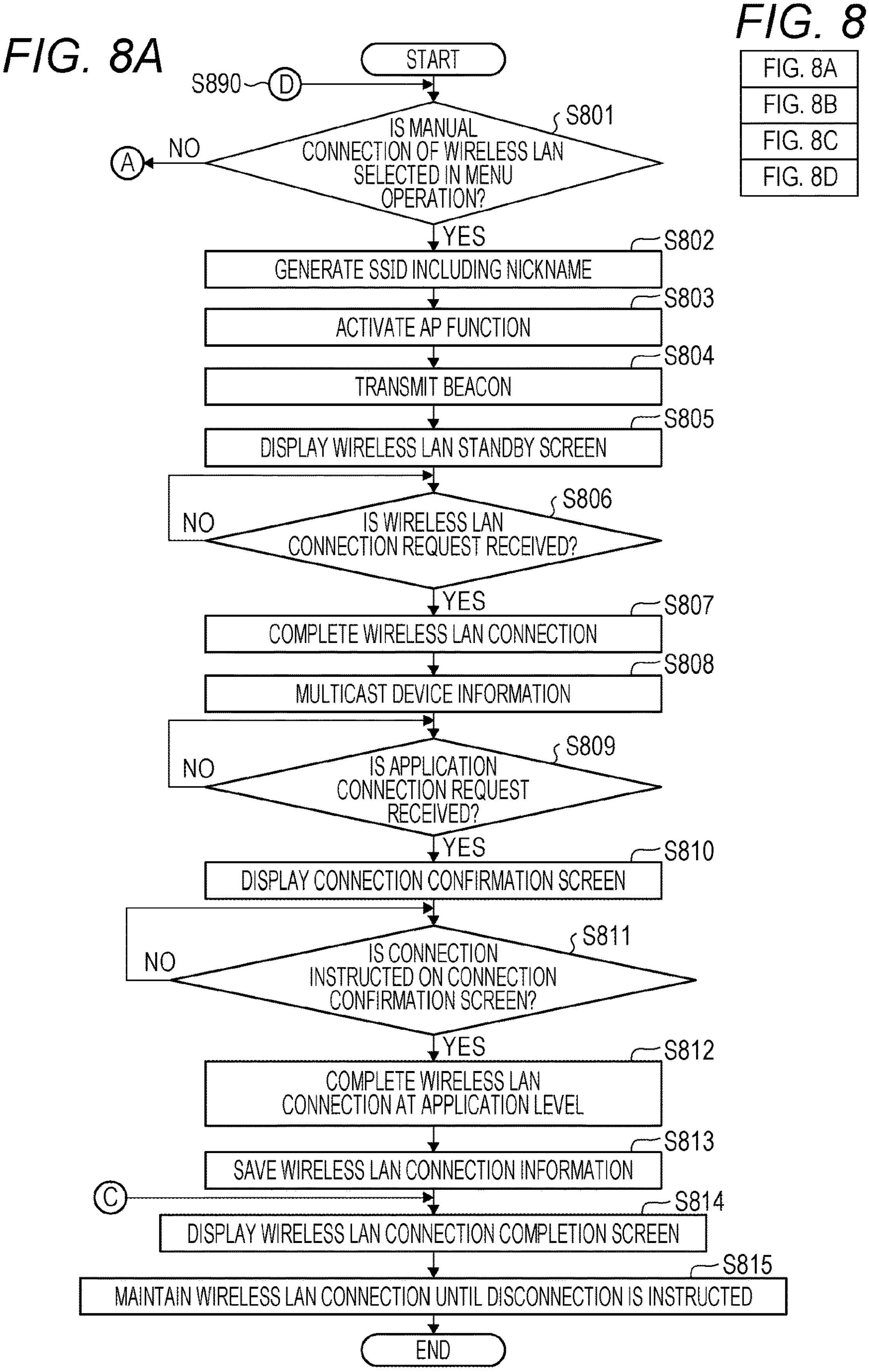
FIGS. 8A to 8D are flowcharts illustrating operation of the digital camera according to the first exemplary embodiment.
Figure 8B:
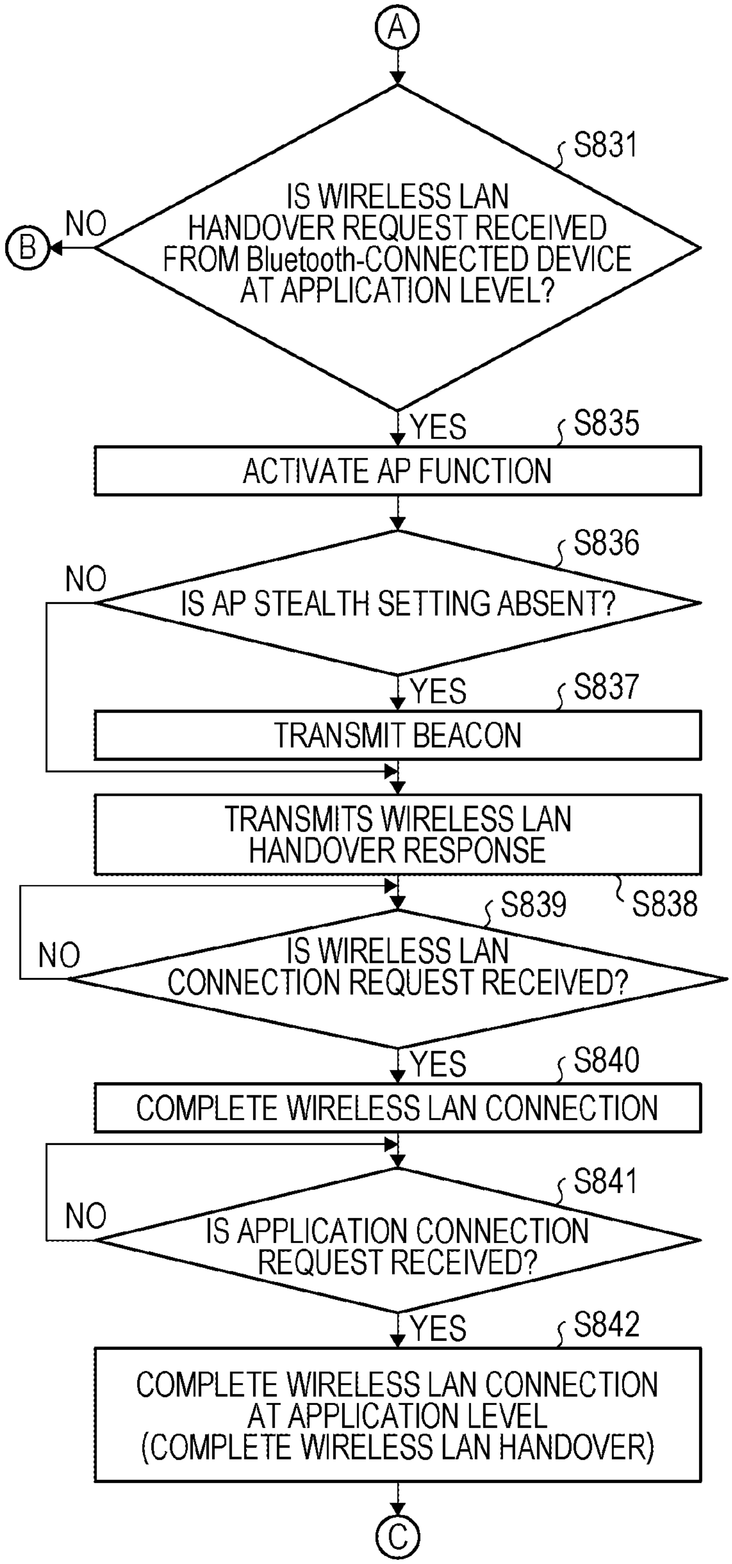
Figure 8C:
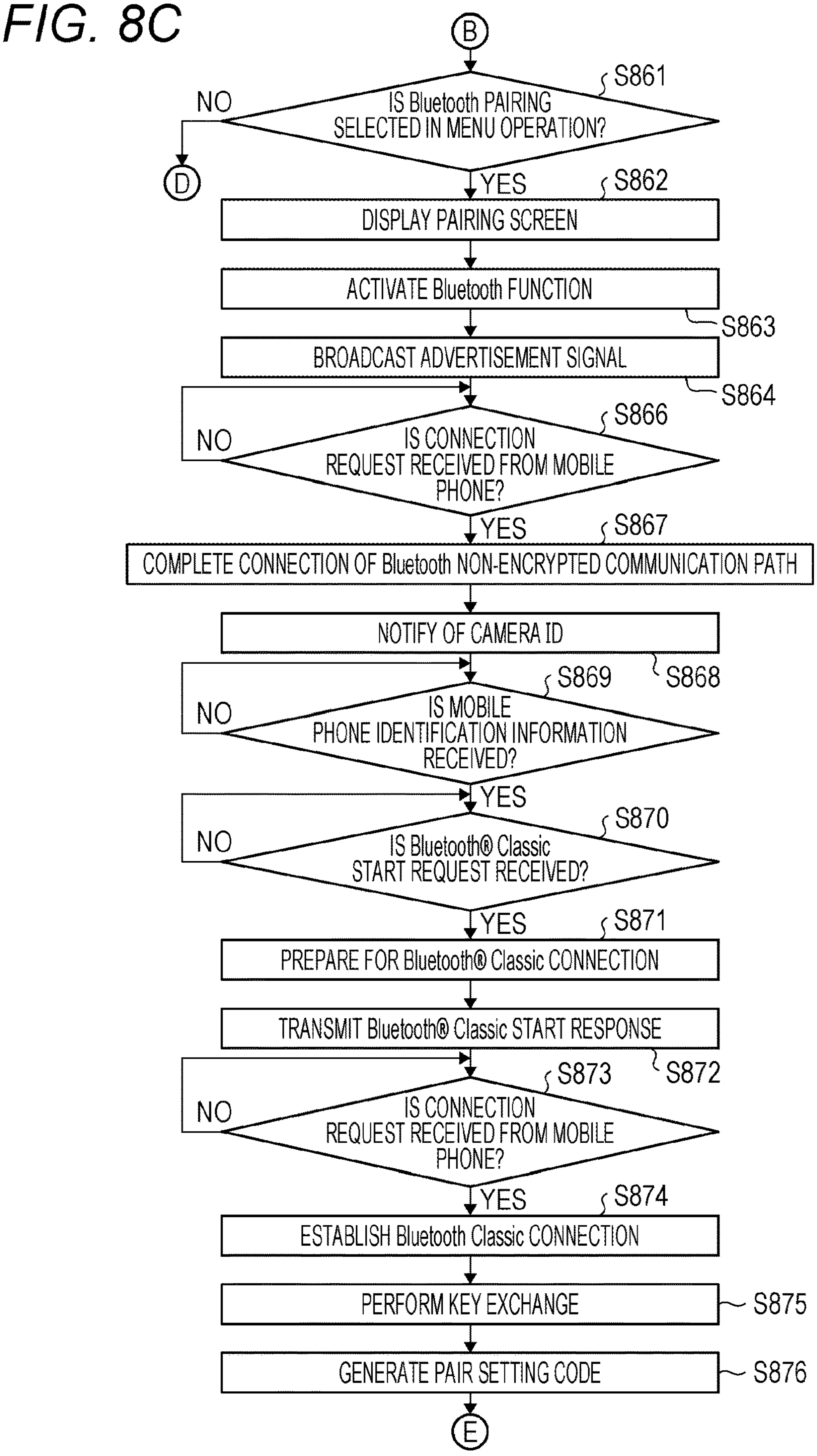
Figure 8D:
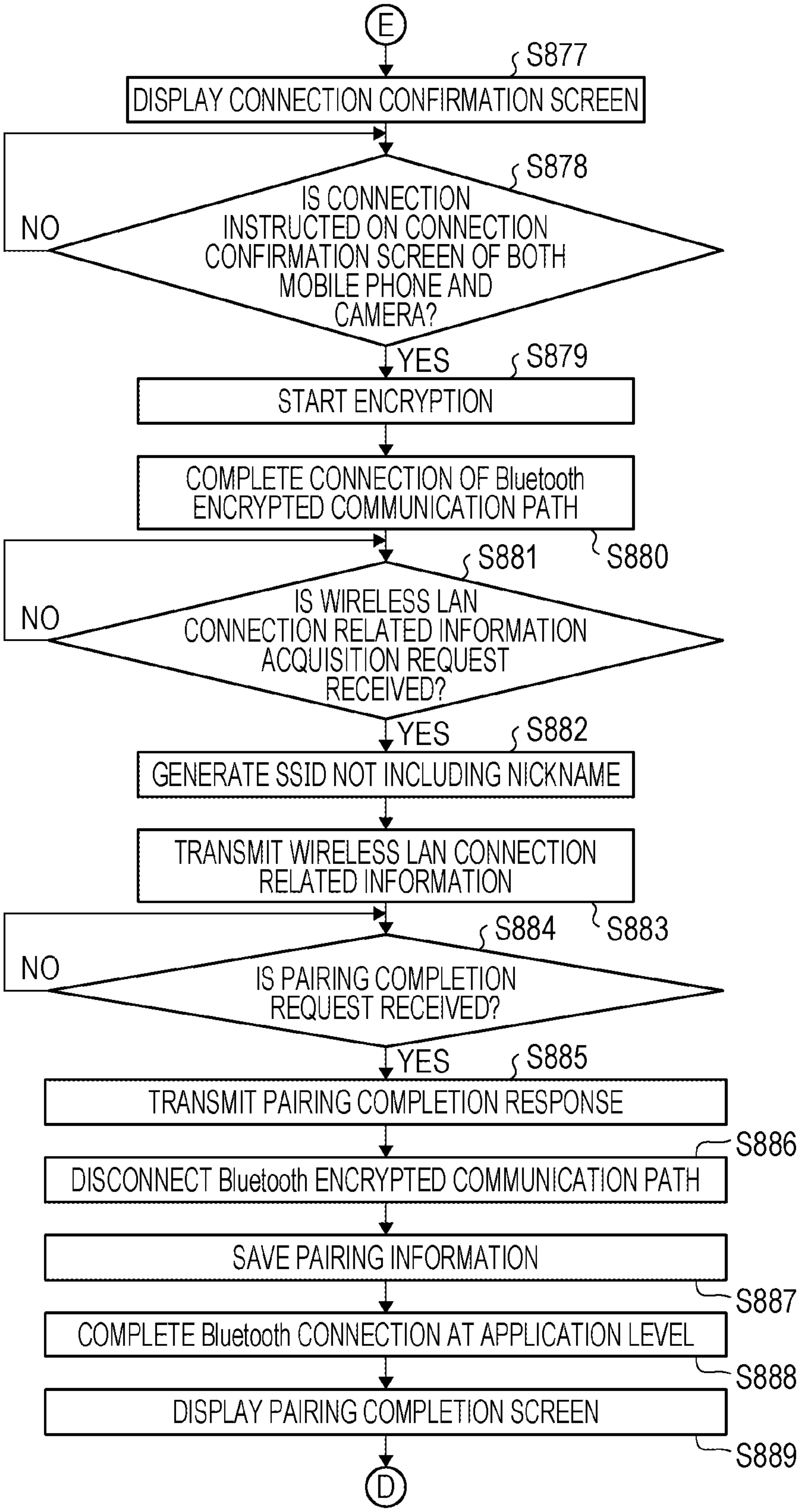

FIGS. 8A to 8D are flowcharts illustrating the operation of the digital camera 100. Processing illustrated in this flowchart is implemented by the control unit 101 of the digital camera 100 controlling each unit of the digital camera 100 in accordance with an input signal or a program. The flowchart illustrated in FIG. 8A is started with a user operation as a trigger, or with a Bluetooth® Low Energy message as a trigger in the case where the pairing of the digital camera 100 and the mobile phone 200 is established by the Bluetooth®.

First, processing when the manual connection of the wireless LAN is performed by a menu operation of the camera 100 will be described.

When the control unit of the camera 100 detects that the manual connection of the wireless LAN is selected in the operation unit 105 by the user (S801), the control unit 101 generates the SSID of the AP in preparation for activating the simple AP function (S802). As described above, the SSID including the nickname is generated here. The processing of S801 corresponds to S503 in FIG. 5.

After generating the SSID, the control unit 101 activates the simple AP function by using the recording medium 110, the work memory 104, and the communication unit 111 (S803). The processing of S803 corresponds to S504 in FIG. 5.

The AP starts broadcasting the beacon including the SSID generated in S802 so that a nearby wireless LAN device can detect the AP (S804). The processing of S804 corresponds to S505 in FIG. 5.

The control unit 101 displays the connection standby screen of FIG. 3C on the display unit 106 of the camera 100 (S805), and stands by until receiving the wireless LAN connection request from the mobile phone 200 (S806).

In a case where the user performs a cancel operation (not illustrated) during the standby state, the control unit 101 interrupts the standby state for the wireless LAN connection, stops the AP function, and returns to a user operation standby state (return to S801).

When the communication unit 111 detects the wireless LAN connection request from the mobile phone 200, the control unit 101 confirms that the notified security key is correct and permits the connection, thereby completing the wireless LAN connection (S807). Although not described in the description of the sequence, an IP address is assigned to a device newly participating in the wireless LAN by a dynamic host configuration protocol (DHCP) server function of the simple AP function. The processing of S807 corresponds to S509 in FIG. 5.

When the communication unit 111 detects that a new device is connected to the network of the simple AP, the control unit 101 multicast-transmits the device information of the camera 100 to the device connected to the AP (S808). The processing of S808 corresponds to S511 in FIG. 5.

When the user instructs the connection to the camera 100 using the dedicated application of the mobile phone 200, the application connection request is transmitted from the mobile phone 200. When the communication unit 111 receives the application connection request (S809), the control unit 101 displays a connection confirmation screen on the display unit 106 (S810), and stands by until the user issues a connection instruction (S811). When the operation unit 105 detects the connection instruction of the user (YES in S811), the control unit 101 of the camera 100 permits the connection of the mobile phone 200, and the wireless LAN connection at an application level is completed (S812). The processing of S811 corresponds to S515 in FIG. 5. The processing of S812 corresponds to S516 in FIG. 5.

The control unit 101 saves wireless LAN connection information of the mobile phone 200 in the non-volatile memory 103 in order to omit a part of a confirmation operation of the wireless LAN connection from the mobile phone 200 in the next and subsequent operations (S813). When the connection at an application level is completed, the control unit 101 displays a wireless LAN connection completion screen on the display unit 106 (S814). Thereafter, the functions of the digital camera 100 via the wireless LAN can be used remotely from the mobile phone 200 in response to the user's instruction. In addition, the wireless LAN connection is maintained until the user instructs a disconnection (S815). Note that, when the disconnection is instructed, the wireless LAN connection is disconnected and the processing ends. Note that, after the processing ends, this processing can be resumed again sequentially from S801, or the power can be turned off.

Next, operation in the case where the Bluetooth® pairing operation is performed by the menu operation of the camera 100 will be described.

When detecting that the Bluetooth® pairing operation is performed by the operation unit 105 (NO in S801, NO in S831, and YES in S861), the control unit 101 of the camera 100 displays, on the display unit 106, a screen indicating that the pairing is being performed (S862). The processing of S861 or S862 corresponds to S603 in FIG. 6.

Subsequently, the near-field wireless communication unit 112 is controlled to activate a Bluetooth® function (S863). The processing of S863 corresponds to S604 in FIG. 6.

The control unit 101 instructs the near-field wireless communication unit 112 to operate as a Bluetooth® Low Energy peripheral device and causes the near-field wireless communication unit 112 to transmit the advertisement signal (S864).

Note that the Bluetooth® Low Energy peripheral device is paired with a Bluetooth® Low Energy central device, and indicates a role of a Bluetooth® Low Energy device. The peripheral device performs broadcast transmission of the advertisement signal to indicate presence of the peripheral device to surroundings so that an opposite party can connect to the peripheral device. The central device periodically scans the advertisement signal, and when a device to be connected is found, the central device requests a connection.

Although omitted in the description of the sequence, the advertisement signal can include only about 20 bytes of user data. The Bluetooth® Low Energy central device that detects the advertisement signal transmits a scan signal to the Bluetooth® Low Energy peripheral device transmitting the advertisement signal. In response to the scan signal, the Bluetooth® Low Energy peripheral device transmitting the advertisement signal transmits a scan response signal including more detailed information about the Bluetooth® Low Energy peripheral device. In the present exemplary embodiment, information including the nickname set by the user is included in the scan response signal. Thus, before the establishment of the Bluetooth® Low Energy connection, the nickname of the camera 100 is notified to the mobile phone 200 scanning the pairing device.

When the near-field wireless communication unit 112 receives the connection request from the mobile phone 200 (S866), the control unit 101 controls the near-field wireless communication unit 112 to establish a connection of the non-encrypted communication path using the Bluetooth® Low Energy (S867). The processing of S866 corresponds to S606 in FIG. 6. The processing of S867 corresponds to S607 in FIG. 6.

The near-field wireless communication unit 112 notifies the connected opposite apparatus of a static Bluetooth® address to be used in the Bluetooth® Classic (S868), and stands by until the mobile phone identification information is notified from the opposite device (S869). The processing of S868 corresponds to S609 in FIG. 6.

In the case where the mobile phone identification information is notified, the near-field wireless communication unit 112 then stands by until a Bluetooth® Classic connection request is notified (S870). Note that, although not illustrated, in a case where a message is not notified from the opposite apparatus according to the procedure, a pairing procedure can be stopped by assuming that the opposite apparatus currently connected using the Bluetooth® Low Energy is not a device for pairing. The Bluetooth® Classic connection request notification of which is stood by in the processing of S870 corresponds to the mobile phone identification information transmitted from the mobile phone in S610 in FIG. 6.

When receiving the Bluetooth® Classic start request from the mobile phone 200, the control unit 101 controls the near-field wireless communication unit 112 to perform the Bluetooth® Classic connection procedure (S871), and transmits a Bluetooth® Classic start response to the mobile phone 200 (S872). When receiving the Bluetooth® Classic connection request from the mobile phone 200 (S873), the control unit 101 controls the near-field wireless communication unit 112 to establish the Bluetooth® Classic connection (S874). The processing of S874 corresponds to S612 in FIG. 6.

According to the specification of the Bluetooth® Classic protocol, the key exchange is performed here (S875) to generate the common pair setting code between the camera 100 and the mobile phone 200 (S876). The processing of S875 corresponds to S613 in FIG. 6.

The control unit 101 displays the connection confirmation screen on the display unit 106 (S877). The pair setting code is similarly displayed on the dialog in the mobile phone 200 that issued the Bluetooth® Classic connection request. When the user confirms that both the camera 100 and the mobile phone 200 display the same number and instructs a connection (S878), the near-field wireless communication unit 112 starts encryption processing (S879), and establishes a connection of an encrypted communication path using the Bluetooth® Classic (S880). Thereafter, messages can be exchanged in the encrypted communication path by secure communication. The processing of S880 corresponds to S616 in FIG. 6.

After the connection of the encrypted communication path is established, the control unit 101 stands by until a wireless LAN connection related information acquisition request is received (S881). When receiving the wireless LAN connection related information acquisition request from the mobile phone 200, the control unit 101 generates an SSID dedicated to wireless LAN handover (S882). In the case of handover from the Bluetooth® to the wireless LAN, since the user can omit a procedure for searching for the AP of the camera 100 by the mobile phone 200, it is not necessary to make the SSID easy to understand. In addition, since the personal information of the user is disclosed more than necessary by including the nickname in the SSID, an SSID not including the nickname of the camera is generated as the SSID dedicated to the wireless LAN handover.

The control unit 101 transmits the wireless LAN connection related information of the camera 100 by the Bluetooth® Classic communication encrypted using the near-field wireless communication unit 112 (S883). The processing of S883 corresponds to S618 in FIG. 6. Subsequently, the control unit 101 stands by until the pairing completion request is received from the mobile phone 200 (S884). When receiving the pairing completion request, the control unit 101 transmits a message including the pairing completion response via the near-field wireless communication unit 112 (S885). The processing of S885 corresponds to S620 in FIG. 6. Since the mobile phone 200 disconnects the Bluetooth® Classic when receiving the pairing completion response, the control unit 101 performs Bluetooth® Classic termination processing to complete a disconnection of the connection of the encrypted communication path (S886). The processing of S886 corresponds to S623 in FIG. 6. The control unit 101 saves the wireless LAN connection related information and the mobile phone identification information acquired from the mobile phone 200 in the non-volatile memory 103 (S887), whereby the Bluetooth® connection at an application level is completed (S888). The processing of S887 corresponds to S621 in FIG. 6. The processing of S888 corresponds to S624 in FIG. 6. Since the display unit 106 displays a pairing completion screen on the display unit 106 (S889) and the Bluetooth® pairing is completed, the control unit enters a standby state again for an event (S890).

Next, operation in the case where the wireless LAN handover is performed in response to the Bluetooth® Low Energy message from the mobile phone 200 will be described.

The control unit 101 of the camera 100 detects that the wireless LAN handover request is received from the near-field wireless communication unit 112 by the Bluetooth® Low Energy message (NO in S801 and YES in S831).

When detecting that the wireless LAN handover request is received, the control unit 101 of the camera 100 activates the simple AP function by using the recording medium 110, the work memory 104, and the communication unit 111 (S835). Since the wireless LAN handover is started in response to the handover request, the SSID dedicated to wireless LAN handover generated at the time of the Bluetooth® pairing is used as the SSID.

In a case where the stealth setting of the AP is invalidated by the user in a setting of the wireless LAN handover of the camera 100 (S836), the control unit 101 transmits the beacon including the SSID through the near-field wireless communication unit 112 (S837). The processing of S837 corresponds to S703 in FIG. 7.

In a case where the stealth setting of the AP is validated (S836), no beacon is transmitted. By applying the stealth setting to the AP, it is possible to prevent a connection request from an unrelated wireless communication terminal. After activating the AP, the control unit 101 transmits a message including the wireless LAN handover response to the mobile phone 200 from the near-field wireless communication unit 112 (S838), and stands by for the connection request from the mobile phone 200 (S839).

The mobile phone 200 transmits the connection request to the wireless LAN, triggered by the reception of the wireless LAN handover response. When the near-field wireless communication unit 112 receives the wireless LAN connection request (S839), the control unit 101 verifies the security key, and if there is no problem, the control unit 101 permits the connection to the AP, and the wireless LAN connection with the mobile phone 200 is completed (S840). The processing of S840 corresponds to S705 in FIG. 7.

When the wireless LAN connection is completed, the mobile phone 200 transmits the connection request at an application level (S841). When the near-field wireless communication unit 112 receives the application connection request, the control unit 101 establishes the wireless LAN connection with the mobile phone 200 at an application level, and completes the wireless LAN handover (S842). The processing of S842 corresponds to S716 in FIG. 7. The control unit 101 displays the wireless LAN connection completion screen on the display unit 106 (S814), and thereafter maintains the wireless LAN connection until the user instructs a disconnection (S815).

The above is the description of the operation of the camera 100.

<Control Flow of Mobile Phone>

Next, operation of the mobile phone 200 for implementing the procedures of FIGS. 5 to 7 described above will be described with reference to FIGS. 9A to 9D.

Figures 9, 9A:
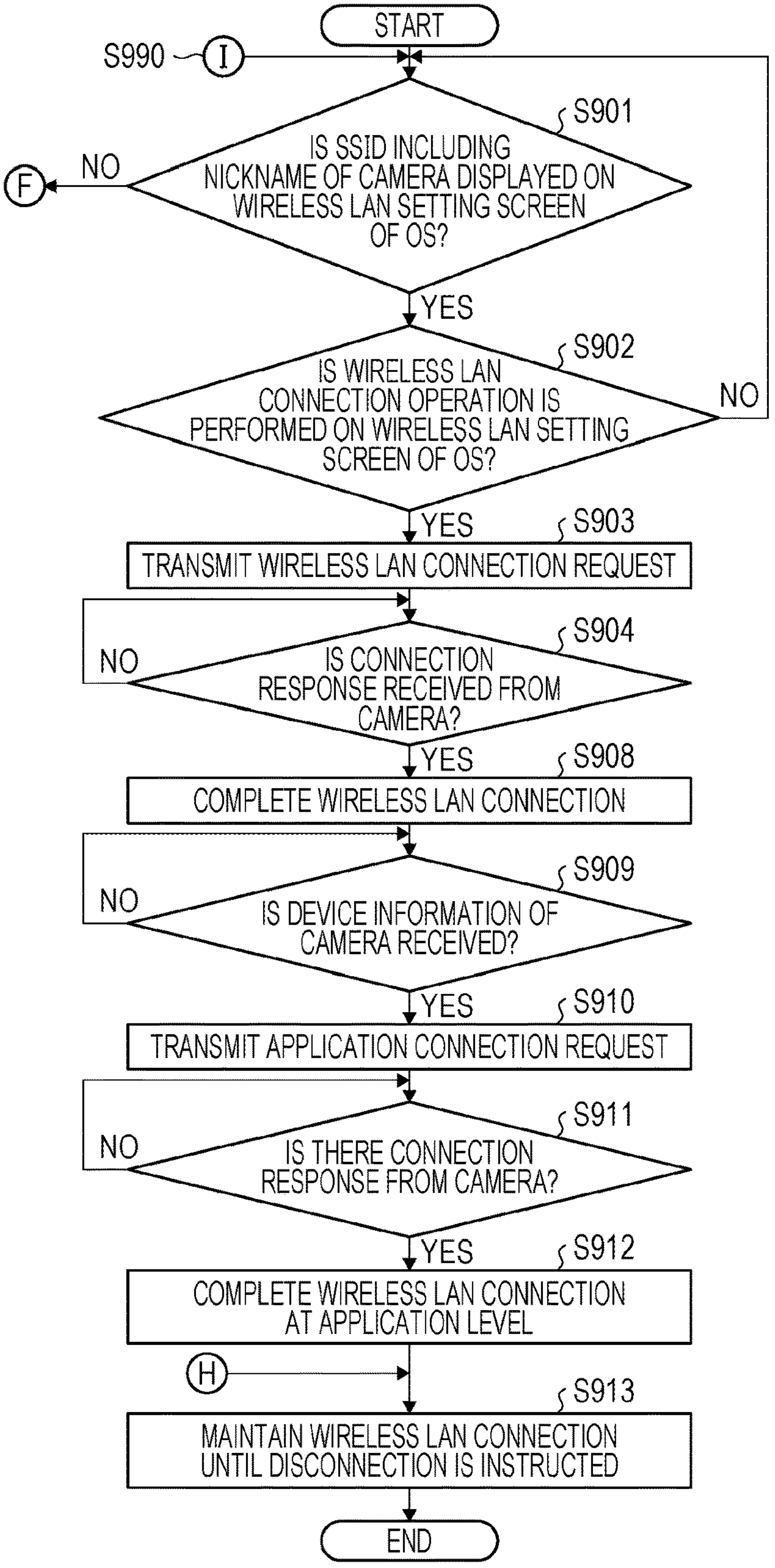
FIGS. 9A to 9D are flowcharts illustrating operation of the mobile phone according to the first exemplary embodiment.
Figure 9B:
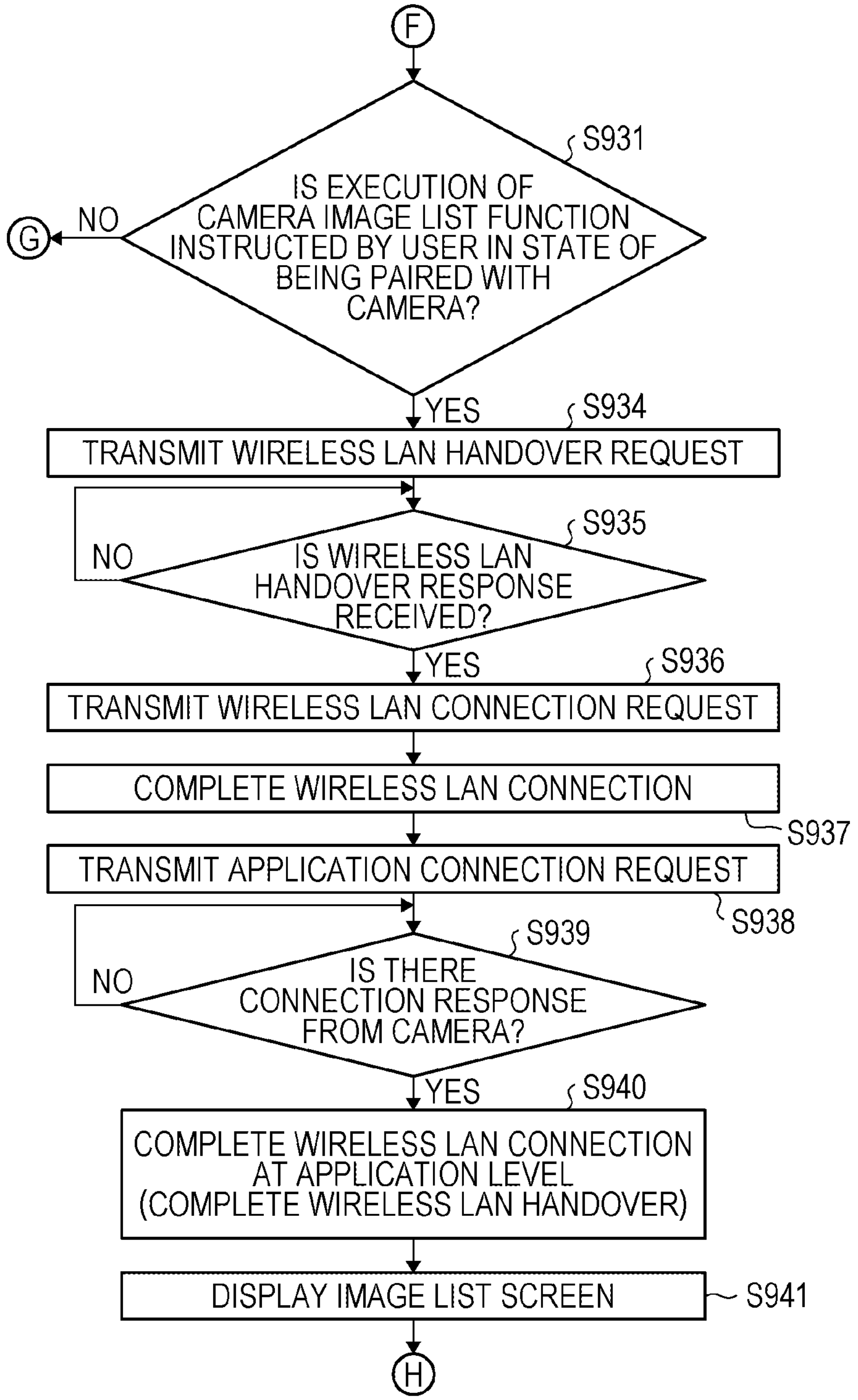
Figure 9C:
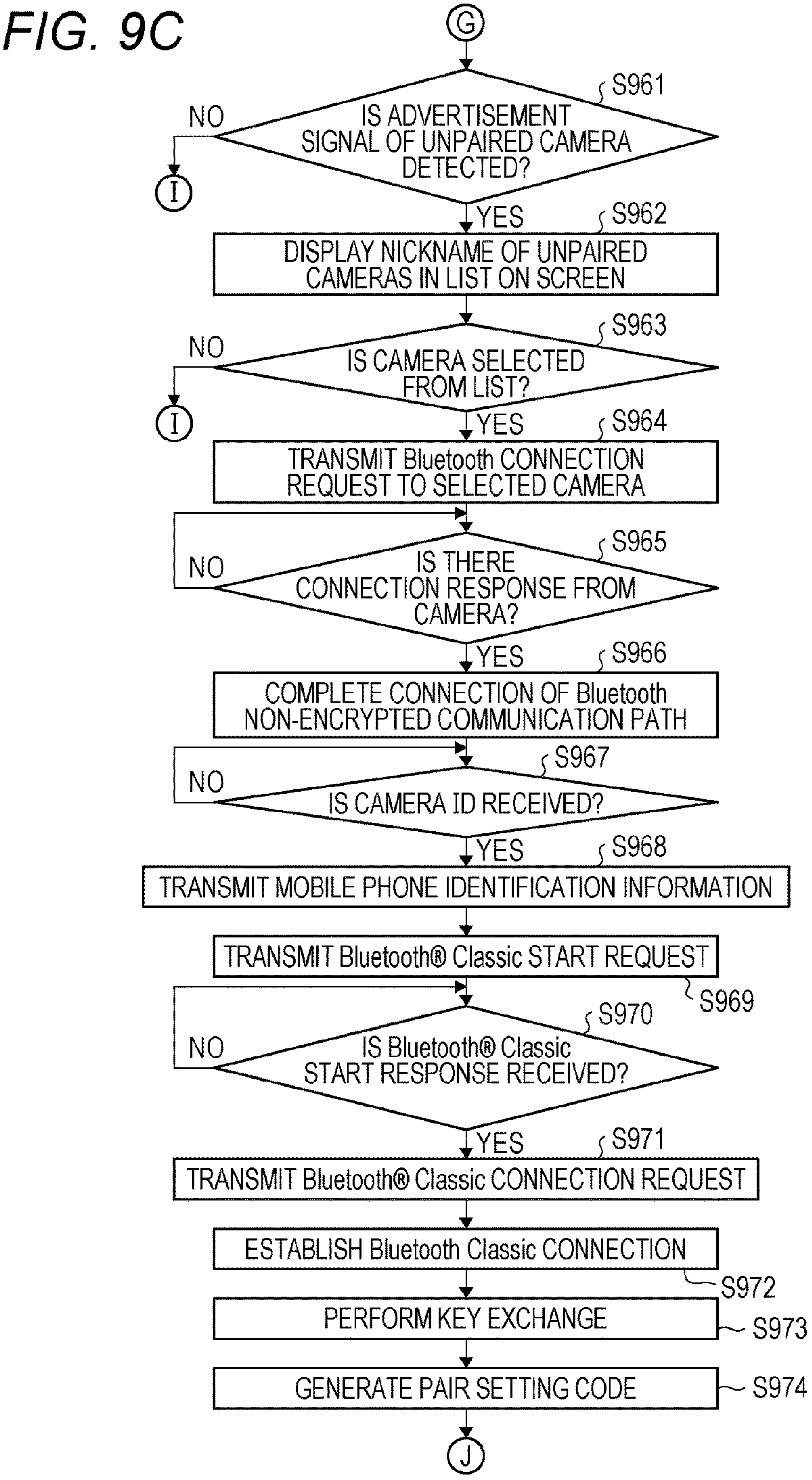
Figure 9D:
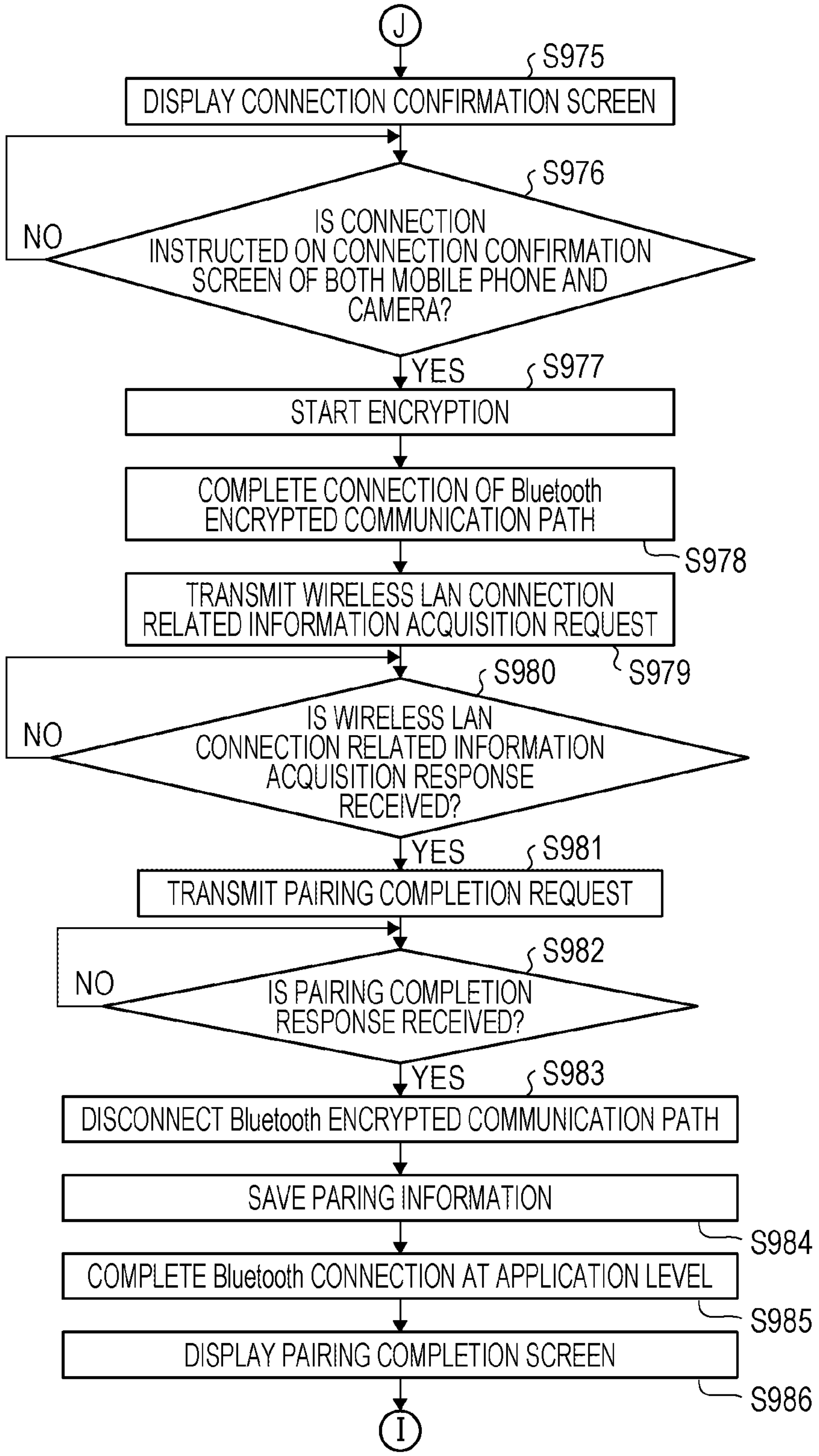

FIGS. 9A to 9D are flowcharts illustrating the operation of the mobile phone 200. Processing illustrated in this flowchart is implemented by the control unit 201 of the mobile phone 200 controlling each unit of the mobile phone 200 in accordance with an input signal or a program. The flowchart illustrated in FIG. 9A is started with a user operation as a trigger, or with a message from a Bluetooth® device as a trigger.

First, a flow at the time of the manual connection of the wireless LAN will be described.

When the user activates the wireless LAN setting screen on the mobile phone 200, the control unit 201 controls the communication unit 211 to search for the APs of the nearby wireless LAN, and displays the list of the SSIDs transmitted by the APs on the wireless LAN setting screen of FIG. 4B (S901). Since the SSID includes the nickname, the user can easily find the camera 100 from the list. When detecting that the user selects the AP of the wireless LAN from the list on the wireless LAN setting screen on the basis of the input from the operation unit 205, the control unit 201 displays the dialog to prompt the user to input the password. When the user inputs the password and instructs a connection, the control unit 201 detects the instruction by the operation unit 205 (S902), and transmits the wireless LAN connection request to the camera 100 (S903). The processing of S902 corresponds to S507 in FIG. 5. The processing of S903 corresponds to S508 in FIG. 5.

When the wireless LAN connection is permitted by the camera 100 and a connection response is received from the camera 100 to the wireless LAN connection request (S904), the wireless LAN connection to the AP of the camera 100 is completed (S908). Although omitted from the sequence, after the wireless LAN connection is completed, an IP address of the mobile phone 200 is assigned by the DHCP server of the camera 100, and thereafter, communication can be performed with a wireless communication device participating in the network of the same AP. The processing of S908 corresponds to S509 in FIG. 5.

When receiving the device information multicast-transmitted by the camera 100 (S909), the control unit 201 controls the communication unit 211 to transmit the application connection request (S910). The processing of S910 corresponds to S514 in FIG. 5.

When a connection response is received from the camera 100 (S911), the wireless LAN connection at an application level is completed (S912). The processing of S912 corresponds to S516 in FIG. 5.

The control unit 201 of the mobile phone 200 indicates to the user that the wireless LAN connection is being made by a method such as lighting an icon on the dedicated application screen of the display unit 206, and maintains the wireless LAN connection until the user instructs a disconnection (S913).

Next, the pairing processing with the camera 100 will be described.

When the near-field wireless communication unit 212 detects the advertisement signal of the Bluetooth® Low Energy peripheral device, the control unit 201 confirms whether the device is the paired device (S901, S931, and S961). In a case where the device is an unpaired device, the control unit 201 displays a list of nicknames of unpaired cameras on the dedicated application screen of the display unit 206 (S962).

The control unit 201 detects that the user selects the camera 100 from the list of the unpaired cameras on the basis of the input from the operation unit 205 (S963), and transmits a Bluetooth® connection request through the near-field wireless communication unit 212 (S964). The processing of S963 corresponds to S605 in FIG. 6. The processing of S964 corresponds to S606 in FIG. 6.

When a connection response is received from the camera 100 (S965), the connection of the non-encrypted communication path is established using the Bluetooth® Low Energy (S966). The processing of S966 corresponds to S607 in FIG. 6.

When the near-field wireless communication unit 212 receives the camera ID of the camera 100 (S967), the control unit 201 transmits the mobile phone identification information via the near-field wireless communication unit 212 (S968). Subsequently, the control unit 201 transmits the Bluetooth® Classic start request (S969). The processing of S968 corresponds to S610 in FIG. 6. The processing of S969 corresponds to S611 in FIG. 6.

When the near-field wireless communication unit 212 receives the Bluetooth® Classic start response from the camera 100 (S970), the control unit 201 transmits the Bluetooth® Classic connection request (S971). The Bluetooth® Classic connection is established when the camera 100 permits the connection (S972). The processing of S972 corresponds to S612 in FIG. 6.

Here, the control unit 201 controls the near-field wireless communication unit 212 to perform the key exchange (S973), generates the pair setting code according to the Bluetooth® Classic protocol (S974), and displays a connection confirmation screen on the display unit 206 (S975). The processing of S973 corresponds to S613 in FIG. 6.

The pair setting code is similarly displayed on the screen of the display unit 106 in the camera 100. When the user confirms that both the camera 100 and the mobile phone 200 display the same number and instructs the connection (S976), the near-field wireless communication unit 212 starts encryption (S977), and establishes the connection of the encrypted communication path using the Bluetooth® Classic (S978). Thereafter, messages can be exchanged in the encrypted communication path of the Bluetooth® Classic by secure communication. The processing of S978 corresponds to S616.

After the Bluetooth® Classic connection is established, the control unit 201 transmits the wireless LAN connection related information acquisition request through the near-field wireless communication unit 212 (S979). The processing of S979 corresponds to S617 in FIG. 6. When the near-field wireless communication unit 212 receives a wireless LAN connection related information acquisition response from the camera 100 (S980), the control unit 201 transmits the pairing completion request to the camera 100 through the near-field wireless communication unit 212 (S981). The processing of S981 corresponds to S619 in FIG. 6. When the near-field wireless communication unit 212 receives the pairing completion response from the camera 100 (S982), the control unit 201 disconnects the Bluetooth® Classic connection through the near-field wireless communication unit 212 to disconnect the encrypted communication path (S983). The processing of S983 corresponds to S623 in FIG. 6.

The control unit 201 saves, as the pairing information, the camera ID collected from the camera 100 and the wireless LAN connection related information in the non-volatile memory 203 (S984). The processing of S984 corresponds to S622 in FIG. 6.

The Bluetooth® connection at an application level is completed by the above procedure (S985), and the control unit 201 displays the pairing completion screen on the display unit 206 (S986).

Next, a flow when handover from the Bluetooth® to the wireless LAN is performed in the state where the Bluetooth® connection with the camera 100 is established will be described.

When execution of a camera image list function is instructed by the user from the operation unit 205 of the mobile phone 200 (S901 and S931), the control unit 201 of the mobile phone 200 controls the near-field wireless communication unit 212 to transmit the wireless LAN handover request (S934). The processing of S934 corresponds to S712 in FIG. 7.

When the camera side is ready, the near-field wireless communication unit 212 receives the wireless LAN handover response (S935).

The control unit 201 reads out the wireless LAN connection related information saved in the non-volatile memory 203, and controls the communication unit 211 to transmit the wireless LAN connection request (S936). The processing of S936 corresponds to S715 in FIG. 7.

When the camera 100 permits the connection, the wireless LAN connection is completed (S937). Subsequently, the control unit 201 controls the communication unit 211 to transmit the wireless LAN connection request at an application level to the camera 100 (S938). The processing of S938 corresponds to S717 in FIG. 7.

When the communication unit 211 receives the connection response from the camera 100 (S939), the wireless LAN connection is completed at an application level, and the wireless LAN handover is completed (S940). The control unit 201 controls the communication unit 211 to perform the wireless LAN communication, acquires the image data from the camera 100, and displays the image list screen on the display unit 206 (S941). Thereafter, the wireless LAN connection is maintained until the user instructs a disconnection (S913).

The above is the description of the operation of the mobile phone 200.

As described above, in the case where the user searches for a communication partner, the SSID including the nickname is generated, and in the case where the user does not need to search for a communication partner, the SSID not including the nickname is generated and used. In this way, security can be improved at the time of the wireless LAN connection by handover. Furthermore, by using the Bluetooth® Low Energy, which is not encrypted, for a trigger for handover and using the Bluetooth® Classic, which is encrypted, for the communication parameter such as an SSID and a password, it is possible to achieve both reduction in power consumption and security.

Other Exemplary Embodiments

One or more functions of the above-described exemplary embodiments can be implemented by providing a program to a system or an apparatus via a network or a storage medium, and one or more processors in a computer of the system or the apparatus reading out and executing the program. The one or more functions can also be implemented by a circuit (for example, an application specific integrated circuit (ASIC)).

Embodiment(s) can also be realized by a computer of a system or apparatus that reads out and executes computer executable instructions (e.g., one or more programs) recorded on a storage medium (that can also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-118134, filed Jun. 21, 2018, which is hereby incorporated by reference herein in its entirety.

What is claimed is:

1. A communication apparatus comprising:

a first communication unit configured to wirelessly communicate with an external apparatus via a first communication method;

a second communication unit configured to generate a network and wirelessly communicate with the external apparatus via a second communication method via the network;

an operation unit configured to receive a user operation for input of a character string for identifying the network; and a control unit configured to control wireless connection with the external apparatus via the second communication unit in a selected procedure from among a plurality of procedures to establish wireless connection, the plurality of procedures including at least a first procedure and a second procedure, wherein, in the first procedure, the control unit controls generating identification information including a first character string, the first character string being based on the character string for identifying the network accepted from the user via the operation unit, and generating a network identified by the identification information including the first character string to wirelessly connect with the external apparatus via the second communication method via the network, and wherein, in the second procedure, the control unit controls generating identification information of the network by using a second character string, the second character being not based on the character string for identifying the network accepted from the user via the operation unit, sharing the generated identification information with the external apparatus via the first communication unit, and generating a network identified by the shared identification information including the second character string, to wirelessly connect with the external apparatus via the second communication method via the network, wherein the second communication method has a higher communication speed than the first communication method.

2. The communication apparatus according to claim 1, wherein the second communication unit generates a network by transmitting a beacon including identification information of a network.

3. The communication apparatus according to claim 1, wherein the wireless communication via the first communication unit is encrypted.

4. The communication apparatus according to claim 1, further comprising a third communication unit configured to wirelessly communicate with the external apparatus via unencrypted wireless communication, wherein the second procedure is started in response to acceptance of a request from the external apparatus via the third communication unit.

5. The communication apparatus according to claim 4, wherein the third communication unit broadcasts an advertisement signal informing a presence of the communication apparatus, and wherein the advertisement signal includes at least a part of the character string.

6. The communication apparatus according to claim 4, wherein the wireless communication via the second communication unit has a higher communication speed than the wireless communication via the third communication unit.

7. The communication apparatus according to claim 4, further comprising an image capturing unit, wherein image data generated by the image capturing unit is transmitted to the external apparatus via the second communication unit and is not transmitted via the third communication unit.

8. The communication apparatus according to claim 4, wherein when a pairing processing with the external apparatus by the third communication unit is completed, pairing processing with the external apparatus by the first communication unit is automatically executed.

9. The communication apparatus according to claim 8, wherein generating the identification information of the network without using the character string is executed subsequent to the pairing processing by the first communication unit, and the wireless communication via the first communication unit is disconnected after the generated identification information is shared.

10. The communication apparatus according to claim 9, wherein the wireless communication with the external apparatus via the third communication unit is maintained in a case where the wireless communication via the first communication unit is disconnected.

11. The communication apparatus according to claim 8, wherein the wireless communication with the external apparatus by the third communication unit is maintained while the pairing processing with the external apparatus by the first communication unit is executed.

12. The communication apparatus according to claim 1, wherein, in the first procedure, the control unit controls the second communication unit to generate identification information including random alphanumeric characters in addition to the character string and to generate a network identified by the generated identification information.

13. The communication apparatus according to claim 1, wherein the first procedure is started in response to acceptance of an operation of a menu for communication.

14. The communication apparatus according to claim 1, wherein the second procedure is not started in a state where the first procedure is started and the first procedure is not started in a state where the second procedure is started.

15. The communication apparatus according to claim 1, further comprising an operation unit configured to select one procedure from among the plurality of procedures including the first procedure and the second procedure, wherein, a control unit configured to establish wireless connection with the external apparatus via the second communication unit in the selected procedure selected by the operation unit.

16. The communication apparatus according to claim 1, the selected procedure is executed for establishing a wireless connection.

17. The communication apparatus according to claim 1, the second character string includes a random character string.

18. A method for a communication apparatus including a first communication unit configured to wirelessly communicate with an external apparatus via a first communication method, a second communication unit configured to generate a network and wirelessly communicate with the external apparatus via a second communication method via the network, and an operation unit configured to receive a user operation for input of a character string for identifying the network, the method comprising:

executing a selected procedure from among a plurality of procedures to establish wireless connection, the plurality of procedures including the first procedure and the second procedure, wherein the first procedure comprises generating identification information including a first character string, the first character string being based on the character string for identifying the network accepted from the user via the operation unit, and generating a network identified by the identification information including the first character string to wirelessly connect with the external apparatus via the second communication method via the network, and wherein the second procedure comprises generating identification information of the network by using a second character string, the second character being not based on the character string for identifying the network accepted from the user via the operation unit, sharing the generated identification information with the external apparatus via the first communication unit, and generating a network identified by the shared identification information including the second character string, to wirelessly connect with the external apparatus via the second communication method via the network.

19. A non-transitory computer-readable storage medium that stores a program for causing a communication apparatus including a first communication unit configured to wirelessly communicate with an external apparatus via a first communication method; a second communication unit configured to generate a network and wirelessly communicate with the external apparatus via a second communication method via the network, and an operation unit configured to receive a user operation for input of a character string for identifying the network, to execute a method, the method comprising:

executing a selected procedure from among a plurality of procedures to establish wireless connection, the plurality of procedures including a first procedure and a second procedure, wherein, the first procedure comprises, generating identification information including a first character string, the first character string being based on the character string for identifying the network accepted from the user via the operation unit, and generating a network identified by the identification information including the first character string to wirelessly connect with the external apparatus via the second communication method via the network, and wherein, the second procedure comprises generating identification information of the network by using a second character string, the second character being not based on the character string for identifying the network accepted from the user via the operation unit, sharing the generated identification information with the external apparatus via the first communication unit, and generating a network identified by the shared identification information including the second character string, to wirelessly connect with the external apparatus via the second communication method via the network.

* * * * *